(12) United States Patent
Wong et al.

(10) Patent No.: US 11,344,830 B2
(45) Date of Patent: May 31, 2022

(54) SYSTEMS AND METHODS FOR PURIFYING NATURAL WATER FOR RECREATIONAL SWIMMING WITH MODULAR FILTRATION UNITS

(71) Applicant: FRIENDS OF +POOL, INC., New York, NY (US)

(72) Inventors: Dong-Ping Wong, New York, NY (US); Oana Stanescu, New York, NY (US)

(73) Assignee: Friends of +Pool, Inc., New York, NY (US)

( * ) Notice: Subject to any disclaimer, the term of this patent is extended or adjusted under 35 U.S.C. 154(b) by 78 days.

(21) Appl. No.: 16/634,038

(22) PCT Filed: Jul. 27, 2018

(86) PCT No.: PCT/US2018/044200
§ 371 (c)(1),
(2) Date: Jan. 24, 2020

(87) PCT Pub. No.: WO2019/023649
PCT Pub. Date: Jan. 31, 2019

(65) Prior Publication Data
US 2020/0164293 A1    May 28, 2020

Related U.S. Application Data

(60) Provisional application No. 62/538,311, filed on Jul. 28, 2017.

(51) Int. Cl.
*B01D 35/30* (2006.01)
*B01D 21/00* (2006.01)
(Continued)

(52) U.S. Cl.
CPC ....... *B01D 35/303* (2013.01); *B01D 21/0003* (2013.01); *B01D 35/027* (2013.01);
(Continued)

(58) Field of Classification Search
CPC .............. B01D 35/303; B01D 35/027; B01D 35/0273; B01D 39/1623; B01D 21/0012;
(Continued)

(56) References Cited

U.S. PATENT DOCUMENTS 1,340,599 A * 5/1920 Clarke ................... B01D 35/02
210/311
D195,848 S    8/1963 Wiedemann
(Continued)

FOREIGN PATENT DOCUMENTS

| AU | 2013211501 A1 | 10/2013 | |
| EP | 0390755 A2 * | 10/1990 | ............... E01C 3/00 |
| RU | 2347751 C2 | 2/2009 | |

OTHER PUBLICATIONS

Tribeca Citizen, "Open Letter: let's Put +Pool in the Seaport," dated Sep. 20, 2018 at https://tribecacitizen.com/2018/09/20/open-letter-lets-put-pool-in-the-seaport.
(Continued)

*Primary Examiner* — Liam Royce
(74) *Attorney, Agent, or Firm* — Bryan Cave Leighton Paisner LLP

(57) ABSTRACT

Systems and methods for filtering unpurified water using modular filtration units are disclosed. According some embodiments of the invention the modular filtration unit may include a modular removable filtration cartridge with pressed non-woven geotextile fabrics and a frame assembly, and a filtration container. The filtration container holds the modular removable filtration cartridges and has walls that form a basin. A first wall has an inlet for receiving water into the filtration container and a second wall has an outlet for draining water out of the filtration container. The water is filtered by the modular removable filtration cartridges as it flows across the basin from the inlet to the outlet. The modular filtration units may be combined together to form a
(Continued)

zoned filtration assembly, which may be inserted into the hull of a floating swimming pool. The zoned filtration assemblies may filter natural water as it fills the swimming pool.

11 Claims, 19 Drawing Sheets

(51) Int. Cl.
  B01D 35/027      (2006.01)
  B01D 39/16       (2006.01)
  C02F 1/00        (2006.01)
  E04H 4/00        (2006.01)
  C02F 103/42      (2006.01)

(52) U.S. Cl.
  CPC .......... *B01D 39/1623* (2013.01); *C02F 1/001* (2013.01); *E04H 4/0012* (2013.01); *C02F 2001/007* (2013.01); *C02F 2103/42* (2013.01); *C02F 2201/006* (2013.01); *C02F 2201/007* (2013.01)

(58) Field of Classification Search
  CPC ................. B01D 21/0003; C02F 1/001; C02F 2001/007; C02F 2103/42; C02F 2201/006; C02F 2201/007; C02F 1/004; E04H 4/0012
  See application file for complete search history.

(56) References Cited

U.S. PATENT DOCUMENTS

| | | | | |
|---|---|---|---|---|
| 3,471,023 | A * | 10/1969 | Rosaen | B01D 46/523 |
| | | | | 210/223 |
| 3,789,432 | A | 2/1974 | Heisner | |
| 3,877,085 | A | 4/1975 | Bukaitz | |
| 4,510,632 | A | 4/1985 | Elsis | |
| D278,932 | S | 5/1985 | Sullivan | |
| 4,915,839 | A * | 4/1990 | Marinaccio | B01D 39/14 |
| | | | | 210/500.23 |
| 5,788,849 | A | 8/1998 | Hutter, Jr. et al. | |
| 6,029,479 | A * | 2/2000 | Pattee | B01D 29/01 |
| | | | | 68/18 F |
| 6,444,119 | B1 * | 9/2002 | Mains, Jr. | B01D 17/0205 |
| | | | | 210/85 |
| 8,164,448 | B2 | 4/2012 | Boudreau | |
| D835,294 | S | 12/2018 | Rathnam | |
| 2002/0164209 | A1 | 11/2002 | Allard et al. | |
| 2011/0168612 | A1 | 7/2011 | Happel | |

OTHER PUBLICATIONS

NY Times, "A Beach for Manhattan," dated Aug. 6, 2018 at https://www.nytimes.com/2018/08/05/opinion/editorials/a-beach-for-manhattan.html.

Architectural Record, Continuing Education: Urban Swimming Holes, dated Aug. 1, 2018 at https://www.architecturalrecord.com/articles/13561-continuing-education-urban-swimming-holes?v=preview.

Observer, "You Can Now Buy a Cindy Sherman-Signed Pool Float on eBay—But Bring Your Checkbook," dated Jul. 20, 2018 at http://observer.com/2018/07/ebay-sells-signed-cindy-sherman-pool-float/.

Artnet, "eBay is Selling a Cindy Sherman Pool Float," dated Jul. 20, 2018 at https://news.artnet.com/art-world/art-industry-news-july-20-2018-1321094.

Robb Report, "Make a Splash with a Trippy One-of-a-Kind Cindy Sherman Pool Float," dated Jul. 19, 2018 at https://robbreport.com/shelter/auctions/make-a-splash-with-trippy-one-of-a-kind-cindy-sherman-pool-float-2807157/.

Vogue, "Cindy Sherman's New Pool Float Will Add Wonderful Weirdness to Any Summer Party," dated Jul. 19, 2018 at https://www.vogue.com/article/16-poolside-accessories-to-brighten-summer-parties.

Flaunt, "Ebay for Charity Auctions off Cindy Sherman Float," dated Jul. 18, 2018 at http://www.flaunt.com/content/ebay-for-charity-auctions-off-cindy-sherman-float?rq=cindy%20sherman.

Sotheby's, "Cindy Sherman Designs a Pool Float to Support + POOL, a Prospective Public Pool Project," dated Jun. 13, 2018 at https://www.sothebys.com/en/articles/cindy-sherman-designs-a-pool-float-to-support-pool-a-prospective-public-pool-project.

Hyperallergic, "Cindy Sherman Turns Her Instagram into an Inflatable Pool Float," dated May 17, 2018 at https://hyperallergic.com/443386/cindy-sherman-turns-her-instagram-into-an-inflatable-pool-float/.

The Urban Developer, "NY Architect Oana Stanescu on Richard Meier, Kanye West and the World's First Floating Pool," date Mar. 29, 2018 at https://theurbandeveloper.com/articles/ny-architect-oana-stanescu-speaks-on-richard-meier-kanye-west-africa-and-the-worlds-first-floating-pool.

Wall Street Journal, "8 Stylish Guys on Their Biggest Bargains and Stupidest Splurges," dated Mar. 28, 2018 at https://www.wsj.com/articles/8-stylish-guys-on-their-biggest-bargains-and-stupidest-splurges-1522253723.

Bedford and Bowery, "East River Floating Pool Gets a Splash of Federal Cash," dated Feb. 7, 2018 at http://bedfordandbowery.com/2018/02/east-river-floating-pool-proposal-gets-a-splash-of-federal-cash/.

West Side Rag, "Could a Floating Pool Bring Swimmers Back to the City's Rivers?," dated Dec. 19, 2017 at https://www.westsiderag.com/2017/12/19/could-a-floating-pool-bring-swimmers-back-to-the-citys-rivers.

NYTimes, "Closing a Racial Divide, One Swim Lesson at a Time," dated Aug. 27, 2017 at https://www.nytimes.com/2017/08/27/nyregion/new-york-city-swim-lessons.html?mcubz=1&_r=2.

The Stable "Heineken: the NY Swimming Pool That Will Clean up NY," dated Aug. 4, 2017 at http://www.thestable.com.au/heineken-the-ny-swimming-pool-that-will-clean-up-ny/.

Digital Journals "The Cities Project by Heineken(R) and Tribeca Studios(R) Debut Documentary Short and Virtual Reality Film About New York's + POOL Project, Narrated by Neil Patrick Harris," dated Aug. 4, 2017 at http://www.digitaljournal.com/pr/3438733.

Substainable Brands, "Heineken and Tribeca Film Festival Make a Splash with +Pool Documentary," dated Aug. 3, 2017 at https://sustainablebrands.com/read/press-release/heineken-and-tribeca-film-festival-make-a-splash-with-pool-documentary.

Bedford and Bowery, "Take a VR Tour of the Floating Pool Proposed for the East River, Narrated by Neil Patrick Harris," dated Aug. 4, 2017 at http://bedfordandbowery.com/2017/08/take-a-vr-tour-of-the-floating-pool-proposed-for-the-east-river-narrated-by-neil-patrick-harris/.

Dailyee, "Heineken & the Cities Project Presents . . . "Floating an Idea: The +Pool Story" Hosted by Angela Yee," dated Aug. 5, 2017 at https://teamyee.tv/heineken-the-cities-project-presents-floating-an-idea-the-pool-story-hosted-by-angela-yee/.

VR Focus, "Tribeca Studios Simulates What It's Like to Swim in New York's Rivers," dated Aug. 6, 2017 at https://www.vrfocus.com/2017/08/tribeca-studios-simulates-what-its-like-to-swim-in-new-yorks-rivers/.

The Drum, "Neil Patrick Harris and Heineken want to swim in New York's East River for latest Cities Project," dated Aug. 4, 2017 at https://www.thedrum.com/news/2017/08/04/neil-patrick-harris-and-heineken-want-swim-new-york-s-east-river-latest-cities.

Untapped Cities, "Floating an Idea: The + POOL Story, A Film Released about NYC's First Floating Filtering Pool," dated Aug. 7, 2017 at https://untappedcities.com/2017/08/07/floating-an-idea-the-pool-story-a-film-released-about-nycs-first-floating-filtering-pool/.

Adweek, "Heineken Really Wants This Floating Swimming Pool to Be Built in a New York City River," dated Aug. 7, 2017 at https://www.adweek.com/brand-marketing/heineken-really-wants-this-floating-swimming-pool-to-be-built-in-a-new-york-city-river/.

(56) References Cited

OTHER PUBLICATIONS

Ad age's Creativity blog, "Heineken Backs a Plan to Build a Floating Pool in NYC's East River," dated Aug. 4, 2017 at https://adage.com/creativity/work/tribeca-pool-project/52391.
Curbed, "Neil Patrick Harris voices new +Pool hype video," dated Aug. 4, 2017 at https://ny.curbed.com/2017/8/4/16099134/neil-patrick-harris-plus-pool.
The Comeback, "Heineken wants to put a pool in New York's river, but doesn't want to pay for it," dated Aug. 8, 2017 at https://thecomeback.com/general/heineken-plus-pool-river-east.html.
Biz Bash, "Why This Hollywood Event Planner Doesn't Promote Her Work on Social Media, AXS Partners to Sell Tickets for Live Events Through Costco, Heineken Wants to Bring a Floating Pool to a New York River," dated Aug. 8, 2017 at https://www.bizbash.com/august-8-2017-why-this-hollywood-event-planner-doesnt-promote-her-work-on-social-media-axs-partners-to-sell-tickets-for/new-york/story/34377#.XD4ROU2ouEW.
Brand Channel, "10 Things You Need to Know for Tuesday, Aug. 8," dated Aug. 8, 2017 at https://www.brandchannel.com/2017/08/08/brand-news-10-things-you-need-to-know-for-tuesday-august-8/.
Secret NYC, "NYC's Floating +Pool Has a New Secret Weapon: Barney Stinson," dated Aug. 8, 2017 at https://secretnyc.co/nycs-floating-pool-new-secret-weapon-barney-stinson/.
RTL Nieuws, "Heineken wil zuiverend zwembad in vervuilde rivier New York," dated Aug. 9, 2017 at https://www.rtlnieuws.nl/geld-en-werk/artikel/1219231/heineken-wil-zuiverend-zwembad-vervuilde-rivier-new-york.
NL Times, "Heineken to help build a Floating, Water Filtering Pool in Dirty NYC River," dated Aug. 9, 2017 at https://nltimes.nl/2017/08/09/heineken-help-build-floating-water-filtering-pool-dirty-nyc-river.
Metropolis, "Plus Pool Asks New Yorkers to Show Their Support," dated Aug. 15, 2017 at https://www.metropolismag.com/ideas/plus-pool-asks-new-yorkers-show-support/.
Designboom, "+ Pool wants you to swim in new york city's rivers," dated Aug. 11, 2017 at https://www.designboom.com/technology/pluspool-water-filtering-floating-pool-new-york-08-11-2017/.
Digital Trends,"+ Pool will be a Swimable Sanctuary in a Sea of Sewage, if NYC Ever Allows It," dated Aug. 12, 2017 at https://www.digitaltrends.com/cool-tech/plus-pool-explained/.
Time Out, "Summer Bluefish Swim Program offers free swimming lessons to underserved youth," dated Jul. 21, 2017 at https://www.timeout.com/new-york-kids/blog/summer-bluefish-swim-program-offers-free-swimming-lessons-to-underserved-youth-072117.
Dnainfo, "High-Tech Pool Designers Give NYCHA Children Free Swimming Lessons," dated Jul. 11, 2017 at https://www.dnainfo.com/new-york/20170711/upper-east-side/nycha-free-swimming-lessons-plus-pool/.
Patch, "Free Swim Lessons Offered to Kids of NYCHA Tenants," dated Jul. 5, 2017 at https://patch.com/new-york/upper-east-side-nyc/free-swim-lessons-offered-kids-nycha-tenants.
Dnainfo, "Heineken Pledges $100K to Floating Pool if It Gets Enough Public Backing," dated Jun. 23, 2017 at https://www.dnainfo.com/new-york/20170623/dumbo/plus-pool-floating-cities-project/.
Dnainfo, "NYC's $20M High-Tech Floating Pool Still Looking for a Home," dated Jun. 19, 2017 at https://www.dnainfo.com/new-york/20170619/dumbo/plus-pool-floating-east-hudson-river-osmosis/.
Fast Company, "What Happens When You Kickstart the Biggest Project of Your Career—in Your 20s," dated May 24, 2017 at https://www.fastcompany.com/90126536/what-happens-when-you-kickstart-the-biggest-project-of-your-career-at-25.
Architects Newspaper, "+Pool gets a corporate sponsor and new website," dated May 11, 2017 at https://archpaper.com/2017/05/pluspool-corporate-sponsor-new-website/.
Time Out, "Here's what you should know about NYC's new floating pool," dated Apr. 25, 2017 at https://www.timeout.com/newyork/blog/heres-what-you-should-know-about-nycs-new-floating-pool-042517.
6sqft, "+ POOL May Come to BBP, Scores Big Backer," dated Apr. 25, 2017 at https://www.6sqft.com/pool-may-come-to-brooklyn-bridge-park-scores-a-big-name-backer/.
Market Wired, "The Cities Project by Heineken(R) Partners With + Pool and Tribeca Film Festival(R) to Reclaim New York's Waters," dated Apr. 24, 2017 at http://www.marketwired.com/press-release/cities-project-heinekenr-partners-with-pool-tribeca-film-festivalr-reclaim-new-yorks-2211489.htm.
Buisness Insider, "The Cities Project by Heineken(R) Partners With + Pool and Tribeca Film Festival(R) to Reclaim New York's Waters," dated Apr. 24, 2017 at https://markets.businessinsider.com/news/stocks/the-cities-project-by-heineken-r-partners-with-pool-and-tribeca-film-festival-r-to-reclaim-new-york-s-waters-1001942982.
Curbed, "New York's + POOL hopes to shore up public support with new campaign," dated Apr. 24, 2017 at https://ny.curbed.com/2017/4/25/15412016/new-york-plus-pool-fundraising-campaignNew York's + POOL hopes to shore up public support with new campaign.
Forbes, "Why this Architect is Spending 10 Years Building a Pool," dated Dec. 12, 2016 at https://www.forbes.com/sites/katherynthayer/2016/12/12/why-this-architect-is-spending-10-years-building-a-swimming pool/#472fae7a6067.
DNA info, "Pop-Up Pool at Brooklyn Bridge Park Should Be Made Permanent: Supporters," dated Aug. 19, 2016 at https://www.dnainfo.com/new-york/20160819/brooklyn-heights/pop-up-pool-at-brooklyn-bridge-park-should-be-made-permanent-supporters/.
Who What Wear, "This $70 Romper Looks Way More Expensive Than It Is," dated Aug. 19, 2016 at https://www.whowhatwear.com/jamie-chung-lou-and-grey-romper/slide3.
Curbed, "NYC's Floating Pool Seeks $1 Million, Plans May 2015 Opening," dated Oct. 2, 2012 at https://ny.curbed.com/2012/10/2/10322484/nycs-floating-pool-seeks-1-million-plans-may-2015-opening.
Gothamist, "New Fundraising Campaign Launched for Floating Pool," dated Oct. 2, 2012 at http://gothamist.com/2012/10/02/checking_in_with_the_floating_river.php.
Inhabitat, "Water Purifying Floating + Pool Cleans New York's Rivers," dated Jul. 26, 2011at https://inhabitat.com/water-purifying-floating-pool-cleans-new-yorks-rivers/.
Turn Style, "Forget Google+, The +Pool is Coming," dated Jul. 12, 2011 at https://www.huffpost.com/entry/forget-google-the-pool-is_b_895748.
ABC News, "Designers plan floating pool for East or Hudson River," dated Jul. 6, 2011 at https://abc7ny.com/archive/8235696/.
Arch Daily, "Plus Pool / Family and PlayLab in collaboration with Arup," dated Jun. 29, 2011 at https://www.archdaily.com/144809/pool-family-and-playlab-in-collaboration-with-arup/.
Wall Street Journal, "An East River Pool? Maybe This Idea Isn't Off the Deep End," dated Jun. 24, 2011 at https://blogs.wsj.com/metropolis/2011/06/24/an-east-river-pool-maybe-this-idea-isnt-off-the-deep-end/?mod=WSJBlog&mod=WSJ_NY_NY_Blog.
New Atlas, "Floating +Pool would let New Yorkers swim in the river," dated Jun. 23, 2011 at https://newatlas.com/plus-floating-swimming-pool-in-nyc-river/19010/.
Dezeen, "Plus Pool by Family and PlayLab," dated Jun. 21, 2011 at https://www.dezeen.com/2011/06/21/pool-by-family-and-playlab/.
NY Post, "'Floating pool' planned for East River in mid-2016," dated Apr. 23, 2014 at https://nypost.com/2014/04/23/floating-pool-planned-for-east-river-in-mid-2016/.
Gothamist, "Chill Out: Your Guide to City Pools," dated Jun. 20, 2011 at http://gothamist.com/2011/06/20/pool_guide.php.
Treehugger, "Bringing a Floating Pool to NYC's East River, Filled With Filtered River," dated Jun. 20, 2011 at Waterhttps://www.treehugger.com/clean-technology/bringing-a-floating-pool-to-nycs-east-river-filled-with-filtered-river-water.html.
Yahoo! News, "Designers Plan Swimming Pools in New York City's Rivers," dated Jun. 17, 2011 at https://news.yahoo.com/blogs/dnainfo/designers-plan-swimming-pools-york-city-rivers-170736933.html.
Huffington Post, "Plus Pool Team Starts Kickstarter Project to Make East River Floating Pool a Reality," dated Jun. 16, 2011 at https://www.huffingtonpost.com/2011/06/16/pool-team-starts-kickstar_n_878209.html.

(56) References Cited

OTHER PUBLICATIONS

Curbed, "East River Floating Pool Concept Now Closer to Reality," dated Jun. 16, 2011 at https://ny.curbed.com/2011/6/16/10461178/east-river-floating-pool-concept-now-closer-to-reality.
Gizmodo, "New York City Needs These River Pools," dated Aug. 11, 2010 at https://gizmodo.com/5610613/new-york-city-needs-these-river-pools.
+Pool "'Sup, Summer?!," at https://us6.campaign-archive.com/?u=eb8e82c349b5455a423502dbb&id=34070be090.
+Pool, "A lot happens when you test the water quality of a river," at https://us6.campaign-archive.com/home/?u=eb8e82c349b5455a423502dbb&id=c50cb3a5b0.
+Pool, "2017 In Review," at https://mailchi.mp/pluspool/what-happened-this-year.
+Pool, "A Peek at Our Solar Shade Studies," at https://mailchi.mp/pluspool/powering-the-pool.
+Pool, "A quick filtration update from our engineers," at https://mailchi.mp/pluspool/our-filters-are-making-this-real.
+Pool, "If it wasn't real before, it sure is now," at https://mailchi.mp/pluspool/how-many-steel-beams-will-it-take-to-build-pool-688789.
+Pool, "Friends of + Pool Announces Prospective Sites for +Pool Launch," at https://us6.campaign-archive.com/?u=eb8e82c349b5455a423502dbb&id=5ca693a3d5.
+Pool, "Ensuring a clean pool (thought the river is pretty clean already)," at https://mailchi.mp/pluspool/never-been-so-excited-to-have-some-structure.
+Pool, "Sike! 2018 in Review," at https://mailchi.mp/pluspool/this-is-not-an-end-of-year-review.
+Pool Will Put a Public Pool in the Middle of NYC's East River, Jun. 17, 2013, Coolthings, https://www.coolthings.com plus-pool-nyc/ (Year: 2013).
Written Opinion and International Search Report for PCT/US18/44200 dated Oct. 10, 2018.
Curbed, "First look at Williamsburg's new, disarmingly cool hotel and pool," dated Aug. 18, 2016 at https://ny.curbed.com/2016/8/19/12538416/william-vale-hotel-williamsburg-pool.
Time Out, "First look at the newly-opened 60-foot pool at the William Vale," dated Aug. 18, 2016 at https://www.timeout.com/newyork/blog/first-look-at-the-newly-opened-60-foot-pool-at-the-william-vale-081816.
Wall Street Journal, "Making a Big Splash, Plus Adam and Eve in Camelot," dated Aug. 18, 2016 at https://www.wsj.com/articles/making-a-big-splash-plus-adam-and-eve-in-camelot-1471561959.
Womens Wear Daily, "+Pool Throws First Pool Party at William Vale Hotel in Brooklyn," dated Aug. 18, 2016 at https://wwd.com/eye/parties/pool-party-william-vale-hotel-williamsburg-10510262/.
InStyle, "Jamie Chung Rocks a Summer-Perfect Romper at a Party Celebrating a Pool Unlike Any Other," dated Aug. 18, 2016 at https://www.instyle.com/news/jamie-chung-pool-summer-new-york-party.
NBC 4 New York, "Free Swim Lessons for NYC Kids Offer Simple Luxury," dated Jul. 26, 2016 at https://www.nbcnewyork.com/news/local/Free-Swim-Lessons-Low-lncome-Children-New-York-City-Plus-Pool-388308822.html.
Pix 11, "Floating pool in East River closer to becoming a reality," dated Jul. 7, 2016 at https://pix11.com/2016/07/07/floating-pool-in-east-river-is-closer-to-becoming-a-reality/.
CityLab, "Splashy (and Suspect) SwimmingPools Are the Hottest DesignTrend of 2016," dated Jun. 20, 2016 at https://www.citylab.com/design/2016/06/floating-and-suspended-swimming-pools-are-the-summer-architecture-trend-of-2016/485849/.
Artsy, "Art and Innovation—A Look inside the SPRING/BREAK Art Show Collaboration with +POOL," dated Mar. 4, 2016 at https://www.artsy.net/article/.
Tech Times, "Dipping Into New York's Waterways in the World's First Floating, Self-Filtering Pool," dated Dec. 17, 2015 https://www.techtimes.com/articles/116986/20151216/dipping-into-new-yorks-waterways-in-the-world-first-floating-self-filtering-pool.htm.
New York Magazine, "Soon You Might Be Able to Swim Safely in Your City's Polluted Harbor or River," dated Dec. 1, 2015 at http://nymag.com/intelligencer/2015/12/soon-you-will-be-able-to-swim-in-polluted-water.html?gtm=bottom>m=top.
Curbed, "Checking in on + POOL," dated Nov. 6, 2015 at https://ny.curbed.com/2015/11/6/9904570/checking-in-on-pool-nycs-futuristic-floating-attraction.
Architectural Digest, "Gala at the Wythe Celebrates the World's First Water-Filtering Floating Pool," dated Oct. 29, 2015 at https://www.architecturaldigest.com/story/worlds-first-water-filtering-floating-pool-new-york-city-plus-pool.
Spoiled NYC, "Seriously? Seriously?," dated Aug. 20, 2015 at https://spoilednyc.com/2015/08/20/seriously-seriously-the-first-boozy-starbucks-has-officially-arrived-in-nyc/.
WSJ, "Pool Party Goers Dip Their Toes and More in the Water," dated Jul. 28, 2015 at https://www.wsj.com/articles/pool-partygoers-dip-their-toes-and-more-into-the-water-1438132125?mod=rss_newyork_main.
RackedNY, "New York City's Floating Pool of the Future Already Has Its Own Swimsuit," dated Jul. 8, 2015 at https://ny.racked.com/2015/7/8/8915515/floating-pool-nyc-bathing-suit.
NY1, "Queens Makes Shortlist for Consideration for Project to Build Floating Pool on City River," dated Jul. 2, 2015 at https://www.ny1.com/nyc/all-boroughs/news/2015/07/2/queens-makes-shortlist-for-consideration-for-project-to-build-floating-pool-on-city-river.
Thrillist, "That Crazy Floating Pool Idea is Almost a Crazy Floating Pool Reality," dated Jun. 25, 2015 at https://www.thrillist.com/news/new-york/nyc-s-crazy-floating-pool-is-eyeing-potential-sites-on-the-hudson-east-nver.
Time Out, "Plus Pool to test 10 sites," dated Jun. 24, 2015 at https://www.timeout.com/newyork/blog/pool-to-test-the-waters-in-10-spots-around-the-city.
Queen's Courier, "LIC and Astoria waterfront to be tested as potential sites for floating pool," dated Jun. 24, 2015 at https://qns.com/story/2015/06/24/lic-and-astoria-waterfront-to-be-tested-as-potential-sites-for-floating-pool/.
Curbed, "New York's Zany Floating Pool Will Test 10 Potential Locations," dated Jun. 23, 2015 at https://ny.curbed.com/2015/6/23/9947296/new-yorks-zany-floating-pool-will-test-10-potential-locations.
Human Being Journal, "Plus Pool," dated May 1, 2015 at https://humanbeing.co/design/pool/.
BuzzFeed Books, "The Future of Architecture in 8 Ingenious Buildings," dated Mar. 26, 2015 at https://www.buzzfeed.com/gabrielsanchez/this-is-the-future-of-architecture#.xeXDAaRv2.
Commercial Observer, "Work Begins on Test Floating POOL," dated Dec. 10, 2013 at https://commercialobserver.com/2013/12/work-begins-on-test-floating-pool/.
Time MagazineThe Plus POOL | The 25 Best Inventions of the Year 2013, dated Nov. 13, 2013 at http://techland.time.com/2013/11/14/the-25-best-inventions-of-the-year-2013/.
NY Times, "The Pop-Up Activist of the Lower East Side," dated Nov. 8, 2013 at https://www.nytimes.com/2013/11/10/nyregion/the-pop-up-activist-of-the-lower-east-side.html?_r=0.
Huffington Post, "This is What New York City Could Look Like in 2033," dated Nov. 4, 2013 at https://www.huffingtonpost.com/2013/11/04/new-york-city-in-20-years_0_n_4182025.html?ec_carp=7372130153879338002.
NY Observer, PlayLab and Family Design Team Makes a Splash With Floating + POOL, dated Sep. 24, 2013 at https://www.huffingtonpost.com/2013/11/04/new-york-city-in-20-years_0_n_4182025.html?ec_carp=7372130153879338002.
Outside Online "Swimming New York City: A Survival Guide / Where can I swim, and is it going to kill me?," dated Aug. 6, 2013 at https://www.outsideonline.com/1917781/swimming-new-york-city-survival-guide.
Time Out New York, "A beach is coming to Manhattan's East Side," dated Aug. 1, 2013 at https://www.timeout.com/newyork/things-to-do/a-beach-is-coming-to-manhattans-east-side.

(56) References Cited

OTHER PUBLICATIONS

Huffington Post, "Floating Pool Project is Fully Funded and New Yorkers Everywhere Should Celebrate," dated Dec. 3, 2018 at https://www.huffingtonpost.com/2013/07/12/floating-pool-project-is-fully-funded_n_3587814.html.
It's Nice That, "Architecture: + Pool is a giant filtration system that makes NYC's rivers swimmable," dated Jul. 10, 2013 at https://www.itsnicethat.com/articles/plus-pool.
Crain's, "East River pool project in race against clock," dated Jul. 10, 2013 at https://www.crainsnewyork.com/article/20130710/HOSPITALITY_TOURISM/130719985/east-river-pool-project-in-race-against-clock.
Pool and Spa News, "Ambitious Pool Gains Attention," dated Jul. 3, 2013 at https://www.poolspanews.com/how-to/codes/ambitious-pool-gains-attention_o.
Manhattan Users Guide, "Up Next," dated Jun. 27, 2013 at https://manhattanusersguide.com/article/up-next-june-27-2013.
PC Mag, "Kickstarter Tech Project of the Week: +Pool," dated Jun. 21, 2013 at https://www.pcmag.com/article2/0,2817,2420801,00.asp.
Good, "Making it Real: A Floating Pool for the East River," dated Jun. 20, 2013 at https://www.good.is/articles/making-it-real-a-floating-pool-for-the-east-river.
Untapped Cities, "Own a Tile of +Pool, A Giant Filtering Floating Pool in the East River," dated Jun. 19, 2013 at https://untappedcities.com/2013/06/19/own-tile-pool-giant-filtering-floating-east-river/.
ArchDaily, +Pool Launches 'Tile by Tile' Kickstarter Campaign dated Jun. 18, 2013 at https://www.archdaily.com/390363/pool-launches-tile-by-tile-kickstarter-campaign/.
Crowdfund Insider, "Crazy Hudson River Pool Launches Second Crowdfunding Campaign, Hopes for Aug. 2013 Test Run," dated Jun. 16, 2013 at https://www.crowdfundinsider.com/2013/06/17503-crazy-hudson-river-pool-launches-second-crowdfunding-campaign-hopes-for-august-2013-test-run/.
The Verge, "Floating public pool that filters New York's East River seeks crowdfunding," dated Jun. 14, 2013 at https://www.theverge.com/2013/6/14/4429350/kickstarter-public-floating-pool-nyc.
NY Mag, "This is What a $15 Million Floating Pool Would Look Like in the East River," dated Jun. 14, 2013 at http://nymag.com/intelligencer/2013/06/amazing-east-river-pool-project-slideshow.html?gtm=bottom>m=top.
NY Daily News, "Proposed pool that will clean and use East River water will be a 'plus' for swimmers," dated Jun. 13, 2013 at http://www.nydailynews.com/new-york/brooklyn/fundraising-campaign-innovative-pool-article-1.1371411.
Brokelyn, "Your chance to own a tiny piece of the floating East River pool," dated Jun. 13, 2013 at https://brokelyn.com/your-chance-to-own-a-tiny-piece-of-the-floating-east-river-pool/.
Time Out, "Help make a floating pool in the East River a reality," dated Jun. 12, 2013 at https://www.timeout.com/newyork/things-to-do/help-make-a-floating-pool-in-the-east-river-a-reality.
Curbed, "East River Floating Pool Offers Early Access to Backers," dated Jun. 12, 2013 at https://ny.curbed.com/2013/6/12/10233550/east-river-floating-pool-offers-early-access-to-backers.
WWD, "Index Picks Its 2013 Finalists," dated Jun. 10, 2013 at https://wwd.com/fashion-news/fashion-scoops/index-picks-its-2013-finalists-6978102/?module=Fashion-Fashion%20Scoops-main.
Economist, "Online start-ups are rallying citizens to revamp their neighborhoods," dated May 18, 2013 at https://www.economist.com/international/2013/05/18/breaking-ground.
USA Today, "Crowdfunding gives rise to projects truly in public domain," dated May 2, 2013 at https://www.usatoday.com/story/news/nation/2013/05/01/crowdfunding-capital-projects/2127541/.
Observer, "Dipping Into the Future: Can +POOL Show the Way to the Future of Funding Architecture?," dated Oct. 9, 2012 at https://observer.com/2012/10/dipping-into-the-future-pool-launches-new-1-million-fundraising-campaign/.

\* cited by examiner

SYSTEMS AND METHODS FOR PURIFYING NATURAL WATER FOR RECREATIONAL SWIMMING WITH MODULAR FILTRATION UNITS

CROSS REFERENCE TO RELATED APPLICATIONS

The present application is the National Stage of International Application No. PCT/US2018/044200, filed on Jul. 27, 2018, which claims benefit to U.S. Provisional Application No. 62/538,311, filed on Jul. 28, 2017. The entire contents of the above applications are incorporated by reference as if recited in full herein.

FIELD OF THE INVENTION

The invention is related to systems and methods for providing a swimming pool and natural water filtration system, and more particularly, to providing a modular filtration system that allows swimming pools to filter natural unpurified water for recreational use without the use of chemical additives.

BACKGROUND OF THE INVENTION

Over the years, many natural bodies of water that were once safe and clean to recreationally swim have become contaminated by various forms of waste. For example, although there are several rivers that are accessible from Manhattan, many swimmers refuse to swim in these waters out of concern that they are too dirty to be safe to swim in.

Instead, many swimmers are forced to resort to in-door or above-the-ground pools for safe and clean swimming environments. Such self-contained pools have been constructed in various urban settings, such as for example, in a building basement, or on a building rooftop. However, constructing a swimming pool such that it is integrated into a natural body of water presents several drawbacks and challenges.

For example, many self-contained swimming pools are filled with water that has been treated with chemicals or additives, such as chlorine. However, environmental and health regulatory agencies generally prohibit or severely limit the type and amount of substances that may be discharged into natural bodies of water to protect the marine life and ecology that thrives in the water. As a result, it would not be permitted to discharge chemicals/additives typically used for cleaning pool water directly into a river, beach, lake, or similar natural body of water.

Some lake-side or beach-side cities and municipals have developed outdoor pools that have been integrated into a natural body of water, such as for example the Bondi Iceberg pools in Australia. However, such outdoor pools are filled with the natural water, and do not provide any filtration or purification of the insourced water. Indeed, such outdoor pools are typically built where the water is already at a level of purity and cleanliness that is safe for swimming. Thus, while outdoor pools are popular in the clean and safe swimming waters of Bondi beach, outdoor pools are not built in waterways that are contaminated or polluted, such as Manhattan's East River.

Accordingly, systems and methods are needed to purify unfiltered or natural water for recreational use without the use of chemicals or additives, so that the purified water meets regulatory requirements for being drained or dispensed into natural bodies of water.

SUMMARY

Systems and methods for filtering unpurified water for swimming in a floating pool using modular filtration units are described herein. According to some embodiments of the invention, the modular filtration unit may include a modular removable filtration cartridge and a filtration container. The filtration cartridge may include pressed non-woven geotextile fabrics, and a frame assembly for holding the pressed non-woven geotextile fabrics together. The filtration container holds the modular removable filtration cartridges and may have two transverse walls and two longitudinal walls forming a basin. The two transverse walls may include a first transverse wall and a second transverse wall, where the first transverse wall has an inlet for receiving water into the filtration container. The inlet may be disposed near the top of the filtration container. The second transverse wall may have an outlet for draining water out of the filtration container. The outlet may be disposed near the top of the filtration container. According to some aspects of the invention, the water in the basin may flow longitudinally from the inlet to the outlet, allowing sediment to collect in a bottom area of the basin. The modular removable filtration cartridge filters the water as it passes from the inlet to the outlet.

In some embodiments of the invention, each of the two longitudinal walls of the filtration container may include a rail for inserting and removing the modular removable filtration cartridge transversely to the longitudinal flow of water passing in the basin. In this way, the modular removable filtration cartridge filters the water by blocking sediment flowing longitudinally from the inlet to the outlet.

In further embodiments of the invention, the first and second transverse walls of the filtration container may include a rail for inserting and removing the modular removable filtration cartridge in parallel with the longitudinal flow of water passing in the basin. In this way, the modular removable filtration cartridge filters the water by blocking sediment flowing transversely across the basin from a first longitudinal wall to a second longitudinal wall.

In yet further embodiments of the invention, the bottom surface of the filtration container may include a receptacle for inserting and a modular removable filtration cartridge. The modular removable filtration cartridge may be tubular and may filter the water by radially absorbing the water through the center of the tubular filtration cartridge.

According to some embodiments of the invention, one or more modular filtration units may be combined together to form a zoned filtration assembly. For example, a first modular filtration unit may be constructed with filters that block sediment flowing longitudinally from the inlet to the outlet, a second modular filtration unit may be constructed with filters that blocks sediment flowing transversely across the basin from the first longitudinal wall to the second longitudinal wall, and a third modular filtration unit constructed with tubular filters that radially absorb water through the center of their tubular filtration cartridge. The water may enter the zoned filtration assembly through the inlet of the first modular filtration unit, flow through the outlet of the first modular filtration unit to the inlet of the second modular filtration unit, and flow through the outlet of the second modular filtration unit to the third modular filtration unit.

According to some embodiments of the invention, one or more zoned filtration assemblies may be inserted into the hull of a floating swimming pool. The swimming pool may be placed in a body of natural water, such as a river, and the zoned filtration assemblies may filter the natural water as it fills the pool. In this way, a modular filtration system may be used to construct recreational swimming areas in natural bodies of water without using chemical substances that may harm the environment. Further, embodiments of the invention may discharge filtered water, effectively reducing the amount of pollutants and impurities in the river water.

BRIEF DESCRIPTION OF THE FIGURES

The objects and features of the invention can be better understood with reference to the following detailed description and accompanying figures.

DETAILED DESCRIPTION

Systems and methods for incrementally removing bacteria and contaminants in a modular filtration system are described herein in relation to FIGS. 1-13. The systems and methods purify water by passing the water through one or more zones of a modular filtration unit. The zones of the modular filtration unit utilize filtration cartridges that remove pathogens, bacteria, and solids that contaminate water as the water passes through from the unit's inlet to its outlet. The outlet of one modular filtration unit may be joined to the entrance of another modular filtration unit, creating a chain of filtration units that comprise a modular filtration system. The modular filtration units may be joined in various configurations to create the perimeter of a pool. An unpurified water source, such as a river or lake, may then be used to fill the pool, by allowing the water to pass through the zones of the modular filtration units. The pool water may then be filtered and drained into the river or lake by exiting through another modular filtration system.

Figure 1:
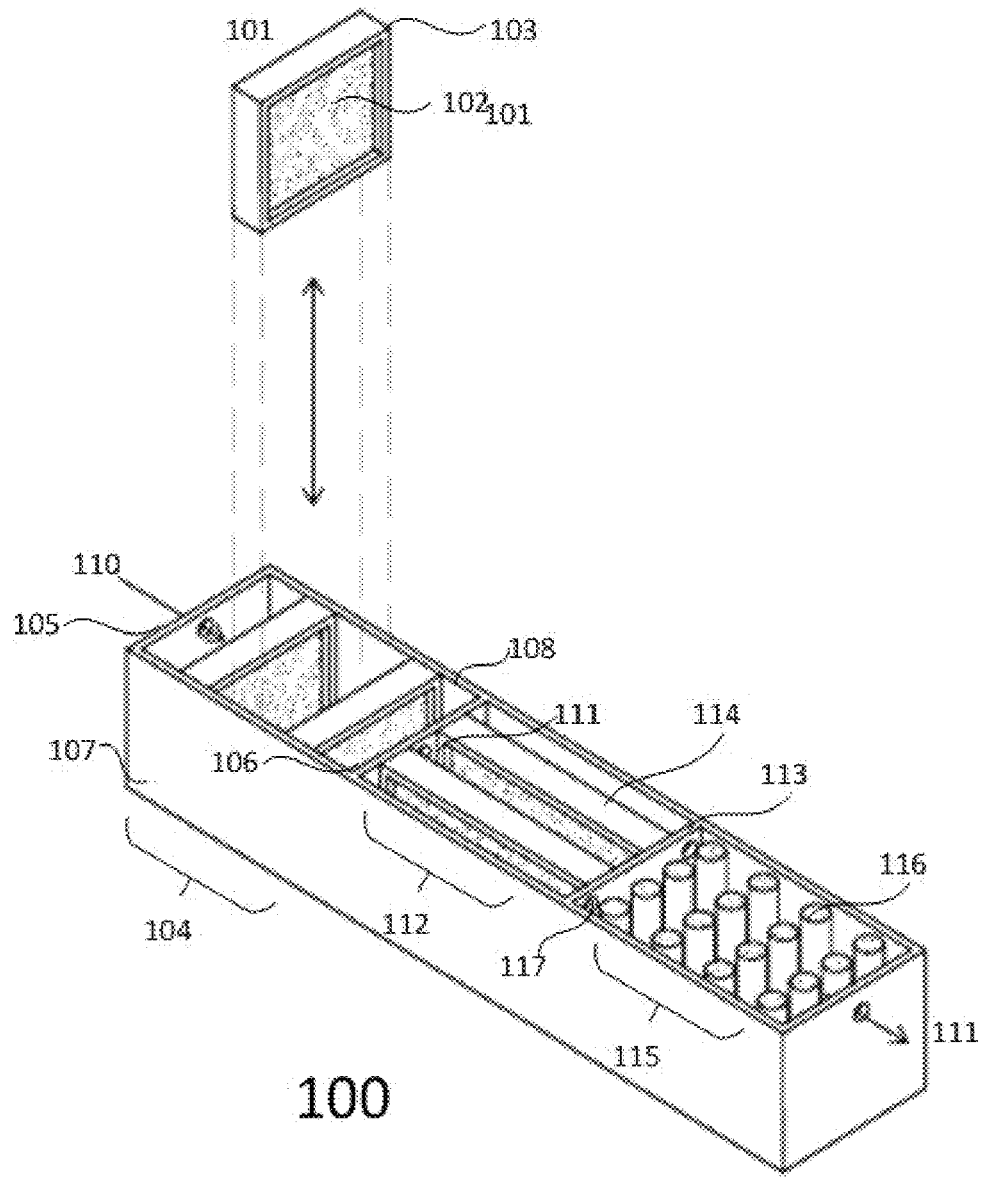
FIG. 1 shows a modular filtration unit according to some embodiments of the invention.

FIG. 1 shows a modular filtration unit for filtering water according to some embodiments of the invention. A modular filtration unit may include a modular removable filtration cartridge 101 comprising a plurality of pressed non-woven geotextile fabrics 102, a frame assembly 103 for holding the plurality of pressed non-woven geotextile fabrics, and a filtration container 104 for holding one or more modular removable filtration cartridges 101. The filtration container may comprise two transverse walls 105 and 106, and two longitudinal walls, 107 and 108, forming a basin.

The two transverse walls include a first wall 105 and a second wall 106 formed at opposite ends of the filtration container. An inlet 110 may be formed in the first wall 105 for receiving water into the filtration container. In some embodiments of the invention, the inlet is disposed proximate to the top edge of the filtration container. For example, the inlet may be formed 6-12 inches from the top edge of the filtration container. An outlet 111 may be formed in the second wall 106 for draining water out of the filtration container. In some embodiments of the invention, the outlet is disposed proximate to the top edge of the filtration container. For example, the outlet may be formed 6-12 inches from the top edge of the filtration container. In some embodiments, the inlet may include a chamber for blocking fish and other unwanted marine life from entering the filtration container. The chamber may include a grill, mesh, or vent on the exterior of the pool with openings spaced apart from each other at a distance small enough to block large fish and other marine life. The water will wash in and out of the chamber, from which the intake inlet may draw water from. The leading edge of the inlet may have a loose-weave geotextile to prevent smaller forms of wildlife and biology, such as for example fish eggs. The filtering of wildlife and biology may occur before the water flows to the filtration cartridges.

According to some embodiments of the invention, the walls, chamber, grill, mesh or vent are formed of stainless steel or plastic, or some combination thereof.

In one aspect of the invention, the water in the basin flows longitudinally from the inlet 110 to the outlet 111. As the water flows longitudinally from the inlet 110 to the outlet 111, outgoing water is replaced by incoming water, and sediment and solids present in unpurified water collect at the bottom of the basin. The water is further filtered by the filtration cartridge 101 as it passes from the inlet 110 to the outlet 111. As described in more detail below, the pressed non-woven geotextile fabrics 102 of the filtration cartridges are formed with sufficiently small pore sizes that enable the fabric to block the sediment and debris that do not sink to the bottom of the basin.

In some embodiments of the invention, each of the two longitudinal walls 107 and 108 includes a groove and rail for inserting and removing a modular removable filtration cartridge. The groove and rail guide the edges of the removable filtration cartridge into the basin such that when the removable filtration cartridge is inserted, the pressed non-woven geotextile fabrics are positioned transversely to the water flowing through the basin. In this way, water moves through the plane of the pressed non-woven geotextile fabrics, while blocking sediment and other particles from flowing from the inlet to the outlet.

In some embodiments of the invention, filtration cartridges comprise a plurality of pressed non-woven geotextile fabrics 102, and a frame assembly 103 for holding the plurality of pressed non-woven geotextile fabrics. The pressed non-woven geotextile fabrics 102 are formed with pores sizes sufficiently small to block sediment and debris while providing a controlled flow rate for water to pass from the inlet through to the outlet. For example, in some embodiments, the pressed non-woven geotextile fabrics are made of nylon and polypropylene staple filaments, and have a permittivity of 1.20 Sec-1, a water flow rate of 80 g/min/sf, and a pore size ranging from 100 microns to 150 microns. The unstructured layering of the filaments in a non-woven geotextile fabric provides additional filtering of sediment and particles, while maintaining a desirable flow rate.

In some embodiments of the invention, the pressed non-woven geotextile fabric is corrugated. Corrugations are formed by folding the fabrics into alternating pleats and ridges. Preferably, the length of each fold is 2 inches. By corrugating the fabrics into pleats, the water flows through a greater surface area of the fabric, thereby improving the capability of the filter to purify the water.

Frame assembly 103 comprises two rectangular frames constructed of a non-corrosive metal or metal compound. The geotextile fabric is secured in between the two rectangular frames by a plurality of fasteners located along the edge of the frames. For example, fasteners may be screws, wingnuts, and bolts that join the two rectangular frames together. In some embodiments, the frame is 7 ft. tall and 3 ft. wide. A geotextile fabric may be cut, folded, stretched or sewn to match the size of the frame assembly, and placed in between the borders of the two rectangular frames. When the two rectangular frames are fastened together, the geotextile fabric is secured along the border of the frame assembly. In some embodiments, the geotextile fabric is cut, folded, stretched or sewn to be approximately larger than the frame assembly, reducing the tension applied across the borders of the fabric. In this way, waves of water that enter the filtration container at high speeds and pressure are less likely to cause a tear or rip in the fabric.

In some embodiments, the outer perimeter of frame assembly 103 may be wrapped with an inflatable gasket. When deflated, the frame assembly and inflatable gasket may be slidingly received by the grooves and rails formed in the transverse or longitudinal walls 105, 106, 107, or 108. If there are any gaps or spaces within the grooves or rails and the frame assembly, the inflatable gasket may be inflated to fill the unoccupied space, creating a water-tight barrier between the frame, the rail, and the bottom of the basin. In this way, the water is forced to pass through each filter, and cannot seep through any cracks or gaps formed in between the filters and the basin.

In some embodiments of the invention, there may be multiple filtration cartridges placed in each filtration container. For example, as shown in FIG. 1, filtration container 104 may include 3 filtration cartridges. As described in more detail below, the number of filtration cartridges may be determined based on the level of water purity and water flow desired for each filtration container.

If there are multiple filtration cartridges in the basin, the pore size of each filtration cartridge may vary based on its position in the filtration container. For example, the filtration cartridges closest to the inlet may have a larger pore size than the filtration cartridges furthest from the inlet. In this way, sediment and particular may be incrementally filtered by size within the same filtration container.

In some embodiments of the invention, the filtration container of the modular filtration unit may be configured with filtration cartridges for blocking sediment and particles flowing transversely across the basin from a first longitudinal wall 107 to a second longitudinal wall 108, or vice versa. For example, filtration container 112 shown in FIG. 1, includes filtration cartridges 114 configured longitudinally along the length of the container, with its geotextiles parallel to walls 107 and 108. Transverse walls 106 and 113 of filtration container 112 may include grooves and rails for inserting and removing modular removable filtration cartridges 114. Water may flow longitudinally from an inlet formed in transverse wall 106, then transversely to the walls 107 and 108 (and perpendicularly to the removable filtration cartridges 114), and then longitudinally again to one or more outlets 117 formed in transverse wall 113. Outlets 117 may be formed proximate to walls 107 and 108 such that the water would be forced to flow through filtration cartridges 114. Removable filtration cartridges 114 may filter the water by blocking sediment flowing transversely across the basin from a first longitudinal wall 107 to a second longitudinal wall 108, or vice versa.

In some embodiments of the invention, the fabrics of the filtration cartridge are made from 10 oz. pressed non-woven corrugated geotextiles. In other embodiments of the invention, the fabrics include 1 micron polyester filter cloths. The polyester filter cloths are constructed with small polymer fibers of varying diameters and lengths into a matrix, and singed on one side to lock the fibers together. Such polyester filter cloths may be obtained, for example, from Duda Diesel, Inc.

In some embodiments of the invention, a modular filtration unit may include a filtration container 115 in which the filtration cartridges 116 are tubular and configured to purify the water by radially absorbing and trapping the contaminants through the center of the tubular filtration cartridge. Filtration cartridge 116 may be constructed from a charged micro-surface cloth media, such as the porous purification blocking media described in U.S. Pat. No. 8,701,895, herein incorporated by reference in its entirety (hereinafter referred to as "Ahlstrom Disruptor Fabrics"). Water passing through Ahlstrom Disruptor Fabrics are purified through an electro-absorption process. The tubular filtration cartridges 116 may be inserted into a receptacle formed at the bottom of the filtration container, thereby securing the filtration cartridges in place.

In one aspect of the invention, the modular filtration cartridges are removable and replaceable. Over time, contaminants and particles may collect on the filtration cartridge, clogging the pores and openings of the filtration fabrics, reducing their ability to filter water. A clogged filtration cartridge may be removed by sliding the cartridge out of the container using the rails and grooves described above. The frame assembly securing the filtration cloth may then be removed and either washed for reuse or dispensed with for replacement with a new filtration cloth. The frame assembly may then be re-fastened and inserted back into the filtration container.

Figure 2:
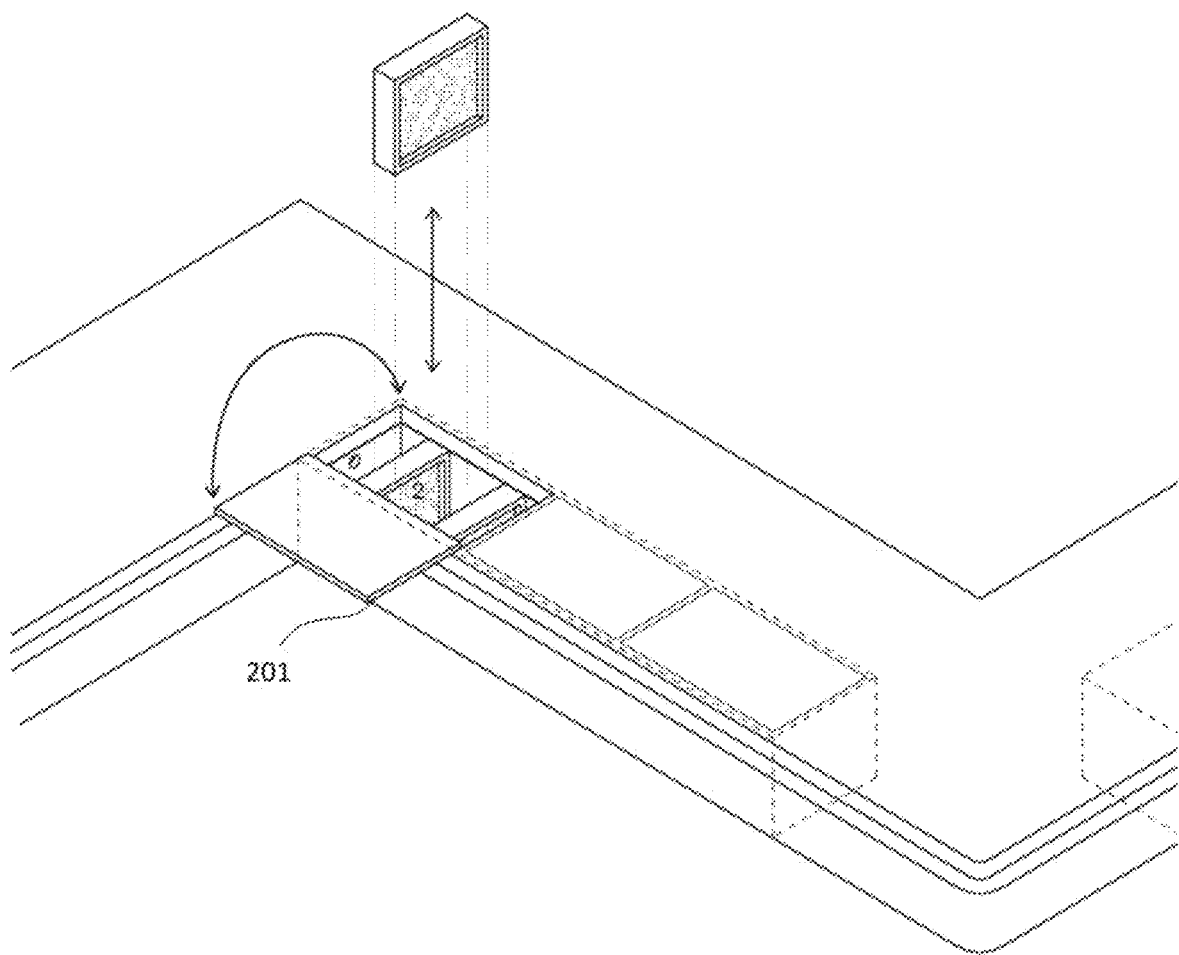
FIG. 2 shows a hatch fora modular filtration unit according to some embodiments of the invention.

In some embodiments of the invention, shown in FIG. 2, the filtration container may be enclosed with a hatch 201. The hatch 201 may be joined along a top edge of the basin by one or more fasteners, such as for example, one or more hinges. The fasteners allow the hatch to rotatably swivel into an open position, providing access to the filtration container. When rotated into an open position, the hatch 201 allows the filtration container to be accessed for maintenance. For example, the hatch may be opened to allow the filtration cartridges to be removed or replaced as described above. When rotated shut, the hatch seals off the filtration container from outside liquids and contaminants that may splash or downpour from the nearby water source (e.g., lake or river), or overhanging rainclouds. For example, the hatch may block unpurified water that would otherwise splash into the filtration container from large waves, or downpour from rainfall, wind, or similar inclement weather. According to some embodiments of the invention, the edges of the hatch may include a neoprene material that creates a water-tight enclosure when the hatch is closed. The hatch edges may, for example, be lined with one or more layers of neoprene fabric or neoprene sealant that become fully waterproof when the hatch is closed.

In one aspect of the invention, the flow of water may be stopped to facilitate the maintenance of the filtration container. A stopper may be plugged or screwed into inlet 110 blocking the water from entering the filtration container. Once water has drained from the filtration container through outlet 111, the dried filtration container may be accessed, facilitating maintenance, such as the removal of the filtration cartridge as described above, or cleaning of the filtration container. In some embodiments, a filtration container may be formed with an emergency outlet (not shown in the figures) if a specific filtration container needs to be isolated and drained immediately. For example, if a foreign object or animal infiltrates a zone in the middle of a chain of filtration containers, it may be desirable to block off its inlet and outlet, and allow the isolated filtration container to drain through a separate emergency outlet that dispenses the water directly back into the natural water source. In yet further embodiments, a filtration container may be isolated without draining its water by using a non-permeable screen to stop the flow of water through that zone. For example, the non-permeable screens may replace the filtration cartridges and halt the flow of water. In other embodiments, the non-permeable screens may be affixed to the walls with outlets, blocking the flow of water into other zones. The pumps and plumbing lines may also be shut off to immediately halt the circulation of water to another cartridge or pool.

In some embodiments of the invention, a zoned filtration assembly may be constructed using any combination of filtration containers described above. For example, filtration container 104 may be combined with filtration container 112 and 115. In one configuration, the outlet of filtration container 104 may be coupled to the inlet of filtration container 112, and the outlet of filtration container 112 may be coupled to the inlet of filtration container 115, forming a chain of filtration containers. The inlet 110 of filtration container 104 may be the entrance for receiving water from a water source, and the outlet 111 of filtration container 115 may be used to drain filtered water into another receptacle, such as for example, a pool. The chain of filtration containers creates layers of filtration zones formed by filtration containers 104, 112, and 115, whereby water is incrementally filtered as it flows from filtration container 104 to filtration container 112, and then to filtration container 115. In this way, the water undergoes three forms of distinct filtration as it passes through the zoned filtration assembly, with each form of filtration blocking different sizes and shapes of sediment and particles that were not blocked by previous filters.

Figure 7:
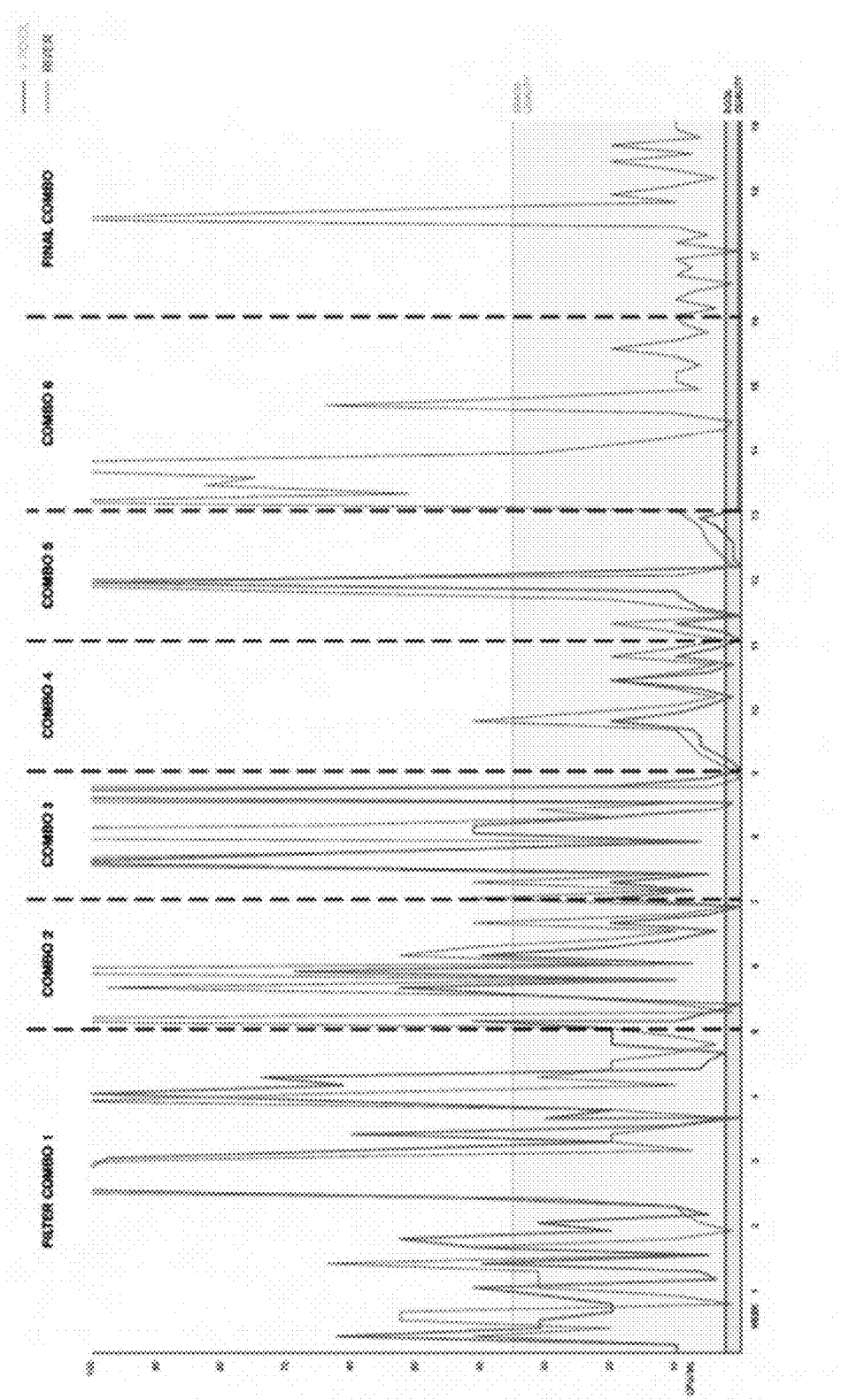
FIG. 7 shows the efficacy of the zoned filtration assemblies in reducing bacteria according to some embodiments of the invention.

As described above, multiple filtration cartridges 101, 114 or 116 may be placed in each filtration container 104, 112, or 115 to achieve a desired level of water purity and water flow. Preferably, in some embodiments, [3] filtration cartridges are placed into filtration container 104, [2] filtration cartridges are placed into filtration container 112, and [12] filtration cartridges are placed into filtration container 115. FIG. 7 shows a water-quality report of the efficacy of certain water filter combinations in reducing bacteria in the water (as measured by CFU/ML). The red line represents the raw untreated water quality of the East River of New York City, and the blue law represents the water filtered by the various combinations of filters according to embodiments of the invention. As FIG. 7 shows, combination 6 and the final combination were capable of drastically reducing the bacteria in the water to below 2 CFU/ML, rendering the water quality fit for pool use, and superior to beach quality water. The "final combination" depicted in the figure corresponds to the three-zone filtration assembly described above, having layers of filtration zones formed by filtration containers 104, 112, and 115, whereby water is incrementally filtered as it flows from filtration container 104 to filtration container 112, and then to filtration container 115.

In one aspect of the invention, the number of zones in a filtration assembly, and the number of filtration cartridges that are utilized in each zone are configured to purify the water to a level that meets EPA, state, and city standards for use for recreational swimming. Specifically, after the water has passed through one or more modular filtration units of a zoned filtration assembly, the water will have approximately less than or equal to 4 coliform units per 100 ml (i.e., 4 cfu/100 ml).

Figure 3:
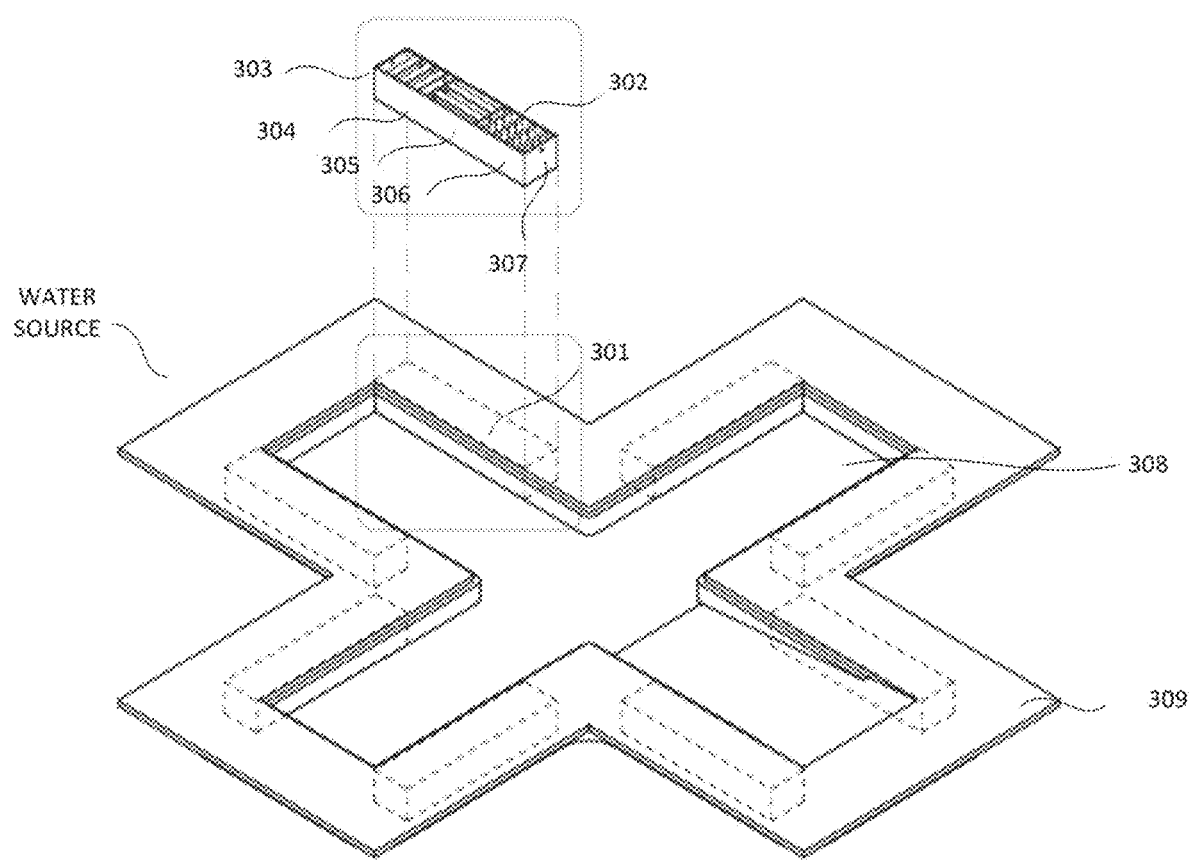
FIG. 3 shows a hull and zoned filtration assembly according to some embodiments of the invention.

In some embodiments of the invention, one or more modular filtration units are joined together along the perimeter of a pool, as shown in FIG. 3. For example, a pool may be formed with a hull 301 for receiving a zoned filtration assembly 302, as described above. The first inlet 303 of the zoned filtration assembly 302 may be configured to receive water from an unpurified water source, such as, for example, a river or lake. The zoned filtration assembly 302 may then be configured to allow the water from the unpurified water source to pass through each zone 304, 305, and 306, whereby the water is incrementally filtered at each stage. Water leaving the last zone through last outlet 307 may be purified to a level that meets EPA, state, and city standards for use for recreational swimming as described above. The water maybe then be directed from the last outlet 307 into a pool 308.

As shown in FIG. 3, according to some embodiments of the invention, the pool is formed in the shape of a plus ("+") symbol. A hull 301 may flank each side of the plus symbol. A pool deck 309 may border the outline of the plus symbol. The pool deck maybe constructed of wood or ceramic tile. Underneath the pool deck, and adjacent to hulls 301, is a ballast formed by chambers of the hull. The ballast allows the pool to securely float above the natural water source it is filtering. In yet further embodiments of the invention, water tank ballasts or air-filled buoys may be secured to provide additional stability to the pool as it floats above the natural water source it is filtering.

Figure 4B:
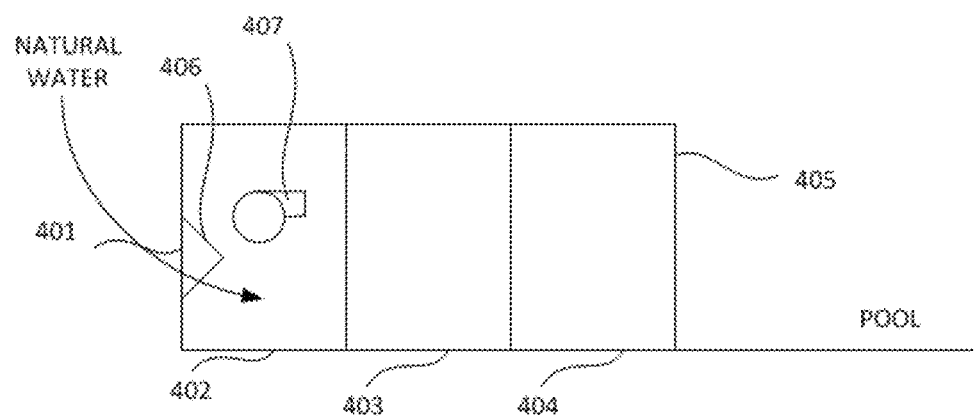
FIGS. 4A and 4B show zoned filtration assemblies for filtering incoming water according to some embodiments of the invention.
Figure 4A:
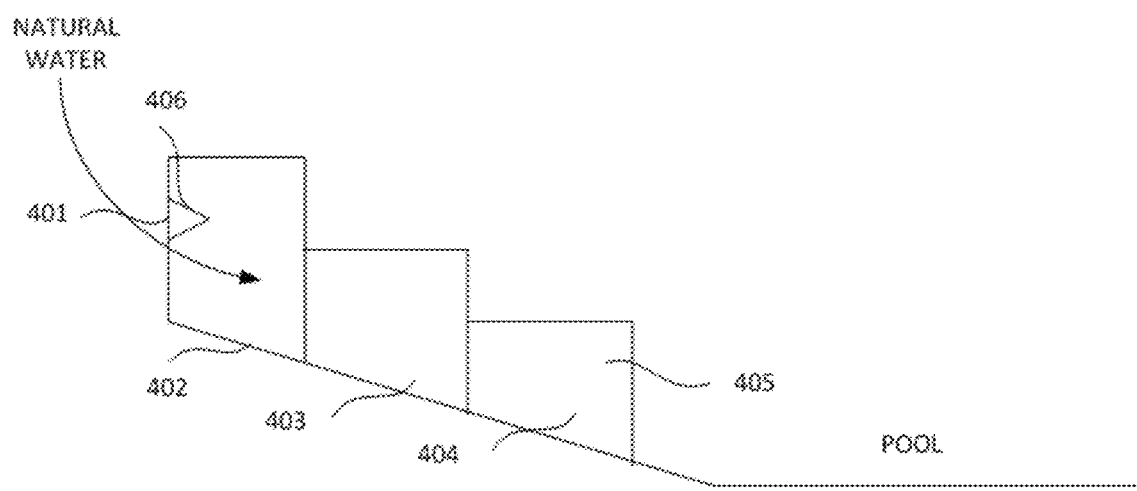

In some embodiments of the invention, the water naturally flows from a first zone through subsequent zones without mechanical or hydraulic assistance from a pump. For example, each filtration zone may be positioned on a decline from its immediately preceding zone, as shown in FIG. 4A, allowing water to trickle down from the first inlet 401 through each zone 401, 402, 403, out the last outlet 405 and into the pool. A one-way valve 406 may be secured behind the first inlet 401 to prevent water that has already entered the inlet from flowing backwards and back into the river or lake from where it came.

In other embodiments of the invention, a pump may be used to propagate water from a first zone to subsequent zones. For example, as shown in FIG. 4B, a pump 407 may be placed in a filtration container and pumps the water flow from one zone to another.

Figure 5:
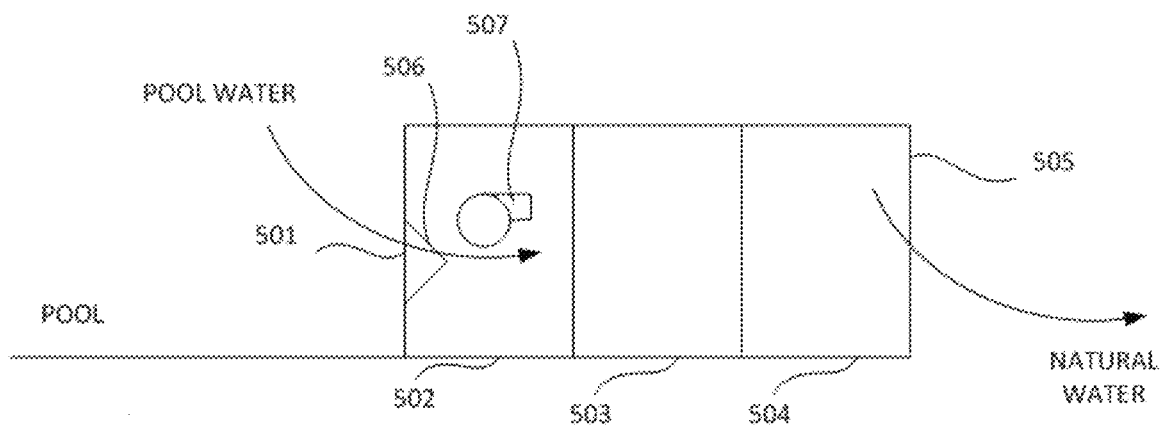
FIG. 5 shows a zoned filtration assembly for draining filtered water according to some embodiments of the invention.

In one aspect of the invention, the systems and methods for filtering water from lakes and rivers into a pool may similarly be used to filter and drain swimming water back out to the lake or river. As shown in FIG. 5, water may exit from the pool through a zoned filtration assembly as described above before being drained into the natural water source. In some embodiments, a portion of the water may be reserved for intake and recirculated, while the rest may be discharged through another zoned filtration assembly. In some embodiments of the invention, the water may be propagated through the zoned filtration system with the assistance of a pump 507. To ensure a consistent level of water in the pool, the pump may be configured to control the flow of water being drained from the pool to match the flow of water entering the pool. The intake may measure the flow rate that water enters the pool, and provide the flow rate to the pump to ensure the discharge maintains equilibrium within the system. As described above, the zoned filtration assembly for draining pool water may include one or more valves 506 so as to ensure that the natural water does not splash or flow back into the pool.

Figure 6:
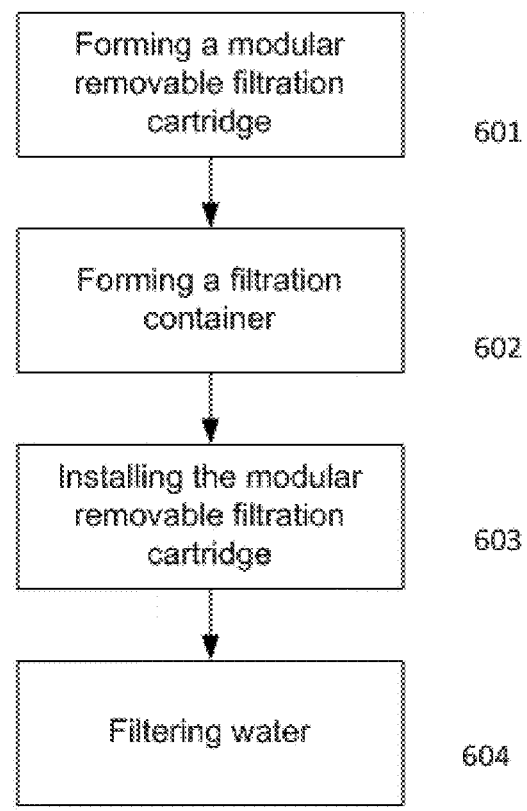
FIG. 6 shows a method for filtering water through a modular filtration unit according to some embodiments of the invention.

Methods for forming modular filtration units and filtering natural water according to some embodiments of the invention are shown in FIG. 6. In step 601, a modular removable filtration cartridge is formed as described above in reference to the filtration cartridges 101 described in FIG. 1 above. The modular removable filtration cartridge may include one or more pressed non-woven geotextile fabrics, and a frame assembly for holding the pressed non-woven geotextile fabrics as described above. In step 602, a filtration container for holding the filtration cartridges is formed as described above in reference to filtration containers 102, 112, or 115 described in FIG. 1 above. The filtration container may include two transverse walls and two longitudinal walls forming a basin, an inlet for receiving water, and an outlet for draining water out of the container. In step 603, the filtration cartridge is installed into the filtration container by sliding the filtration cartridge through grooves and rails as described above. In step 604, water is filtered by the modular removable filtration cartridge as it enters the inlet of the filtration container and passes through the basin.

Additional Embodiments of a Modular Filtration Unit

Figure 8A:
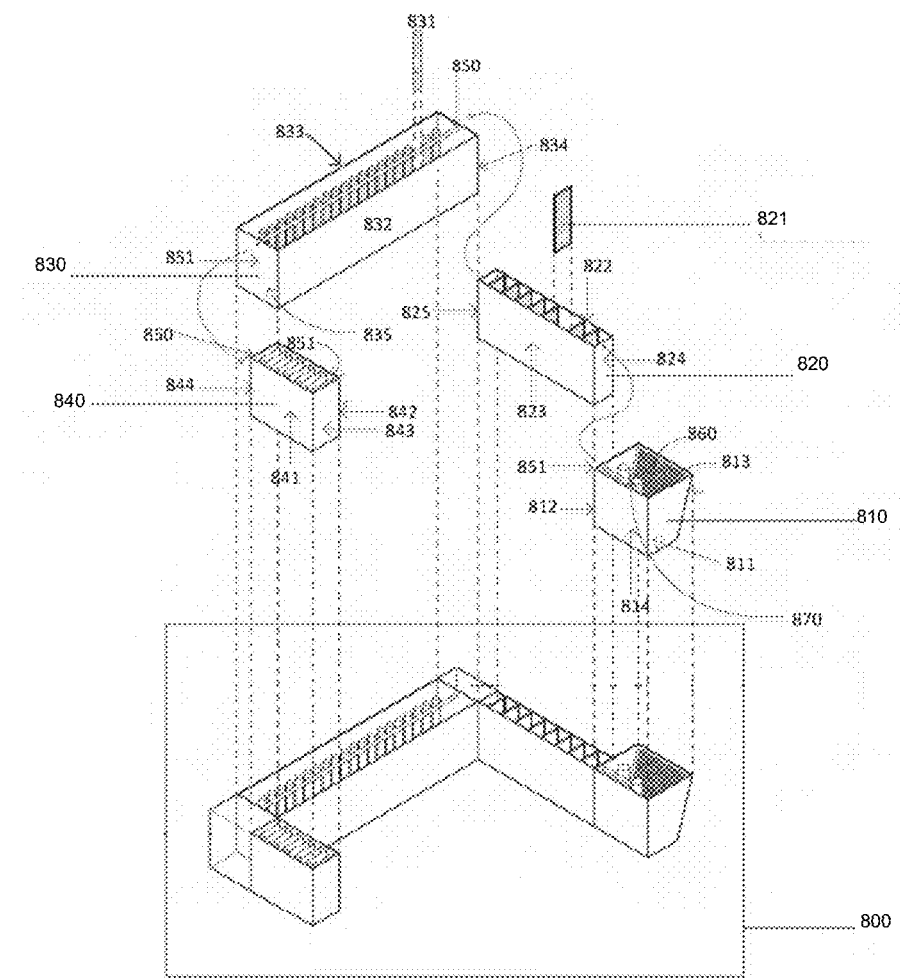
FIG. 8A to 8B show a modular filtration unit and representative flow diagram according to some embodiments of the invention.

FIG. 8A shows a modular filtration unit 800 for filtering water according to some embodiments of the invention. In some embodiments, a modular filtration unit comprises an intake 810 connected to a pre-filtration 820 unit. In some embodiments, the pre-filtration 820 unit is connected to an ultrafiltration 830 unit. In some embodiments, the ultrafiltration 830 unit is connected to a heat exchange 840 unit.

In some embodiments, the pre-filtration 820 comprises one or more filtrations screens. In some embodiments, the screens are removable. In some embodiments, the screens comprise a geotextile screen, such as a pressed non-woven geotextile fabric screen. In some embodiments, the ultrafiltration 830 module comprises one or more removable ultrafiltration cartridges.

According to some embodiments, each unit comprises two transverse walls and two longitudinal walls forming a basin. In some embodiments, water (e.g. from a body of water such as a lake or river) enters into the modular filtration unit 800 at the intake 810, then passes sequentially through the intake 810, pre-filtration 820 unit, ultrafiltration 830 unit, and heat exchange 840 unit. In some embodiments, the water passes through the intake unit in a direction parallel to walls 811 and 812, then passes through the pre-filtration unit parallel to walls 822 and 823, then passes through the ultrafiltration unit parallel to walls 832 and 833, then passes through the heat exchange unit parallel to walls 841 and 842. According to some embodiments, one or more walls in the modular filtration unit comprises an inlet 850 for receiving water and an outlet 851 for draining water. As the water flows through each unit and ultimately exits the heat exchange 840 unit, outgoing water is replaced by incoming water at the intake 810 unit. In this manner, water is moved through the various filters (e.g. 870, 821, and 831), which removes sediment, particulates, pathogens, and other water impurities. According to some embodiments, the filters are effective to prevent the passage of water impurities of a particular size. In some embodiments, the filters are effective to block water impurities while providing a controlled flow rate for water to pass from an inlet 850 to an outlet 851. For example, in some embodiments, a filter may have a permittivity of 1.20 Sec-1, a water flow rate of 80 g/min/sf, and a pore size ranging from 100 microns to 150 microns.

According to some embodiments, the water is moved between the filtration units via pumps that are effective to draw and expel water. In some embodiments, there is at least 1, at least 2, at least 3, at least 4, at least 5, at least 6, at least 7, at least 8, at least 10, at least 12, at least 15, or more, pumps that are effective to move water between the units. In some embodiments, there are two pumps, one before the ultrafiltration unit and one after the ultrafiltration unit. In some embodiments, the pumps are effective to draw water through the various units and/or push water through the various units.

According to some embodiments, the intake 810 unit is effective to provide a reservoir from which water is drawn. In some embodiments, the intake 810 unit comprises perforations in one or more walls that are effective to allow passive water flow, both in and out of the intake 810 unit. According to some embodiments, the intake 810 unit is protected by gratings 860 (such as removable gratings). In some embodiments, the intake 810 unit is positioned partially or wholly under the surface of a body of water. In some embodiments, the intake 810 unit is a sea-chest. According to some embodiments, the intake unit 810 comprises one or more filters 870, through which water is drawn from the intake into the pre-filtration 820 unit. In some embodiments, the filters 870 are cylindrical strainer baskets. In some embodiments, there is a primary filter 870, and a secondary filter 870 as a backup.

According to some embodiments, the modular units may comprise multiple filters. For example, in some embodiments, the pre-filtration 820 unit comprises at least 2, at least 5, at least 8, at least 20, or at least 50 filters, such as removable geotextile screens. In some embodiments, the ultrafiltration 830 unit comprises at least 5, at least 10, at least 15, at least 20, at least 30, or at least 50 filters, such as ultrafiltration cartridges. According to some embodiments, the number of filters present in each module is effective to provide a level of water purity that is suitable for human bathing and effective to provide a desired water flow.

In some embodiments, the filters located in the intake 810, pre-filtration 820 and ultrafiltration 830 units permit the passage of different sized particles (e.g. via differing pore size). For example, the filters in the intake unit will have a larger pore size than the filters in the pre-filtration unit, and the filters in the pre-filtration unit may have a larger pore size than the filters in the ultrafiltration unit. In this manner, water impurities of various sizes may be incrementally filtered out of the water by size, within a single modular filtration unit 800.

According to some embodiments, the various filtration modules are arranged such that they may be parallel to at least three sides of a quadrilateral. According to some embodiments, the various filtration modules are arranged in a semi-U shape. In some embodiments, the ultrafiltration 830 unit is arranged perpendicular to the pre-filtration 810 and heat exchange 840 units.

In some embodiments, one or more modular filtration units are arranged around a hull that is effective to hold water. In some embodiments, a hull holding the water has the shape of a plus (+) sign and one or more modular filtration units are arranged around the ends of the plus. According to some embodiments, the hull holding water has the dimensions as shown and described in FIG. 9A to FIG. 9E.

In some embodiments, the arrangement of modular filtration units around a hull holding water is effective to stabilize or balance the hull, such as when the hull floats in a lake or river. According to some embodiments, at least 1, at least 2, at least 3, or at least 4 modular filtration units are arranged around a hull holding water.

Flow Through/Recirculation

Figure 8B:
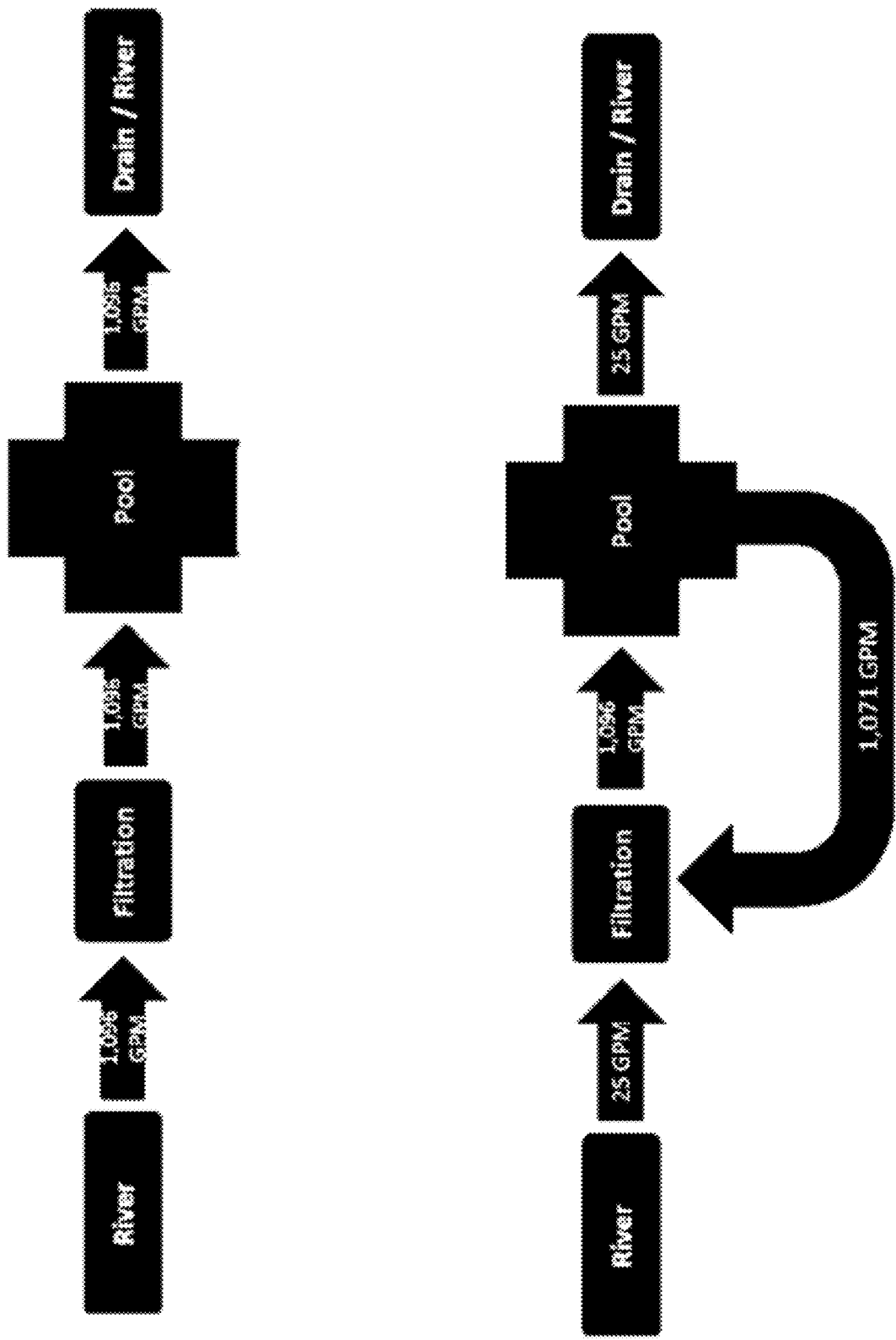
Figure 9A:
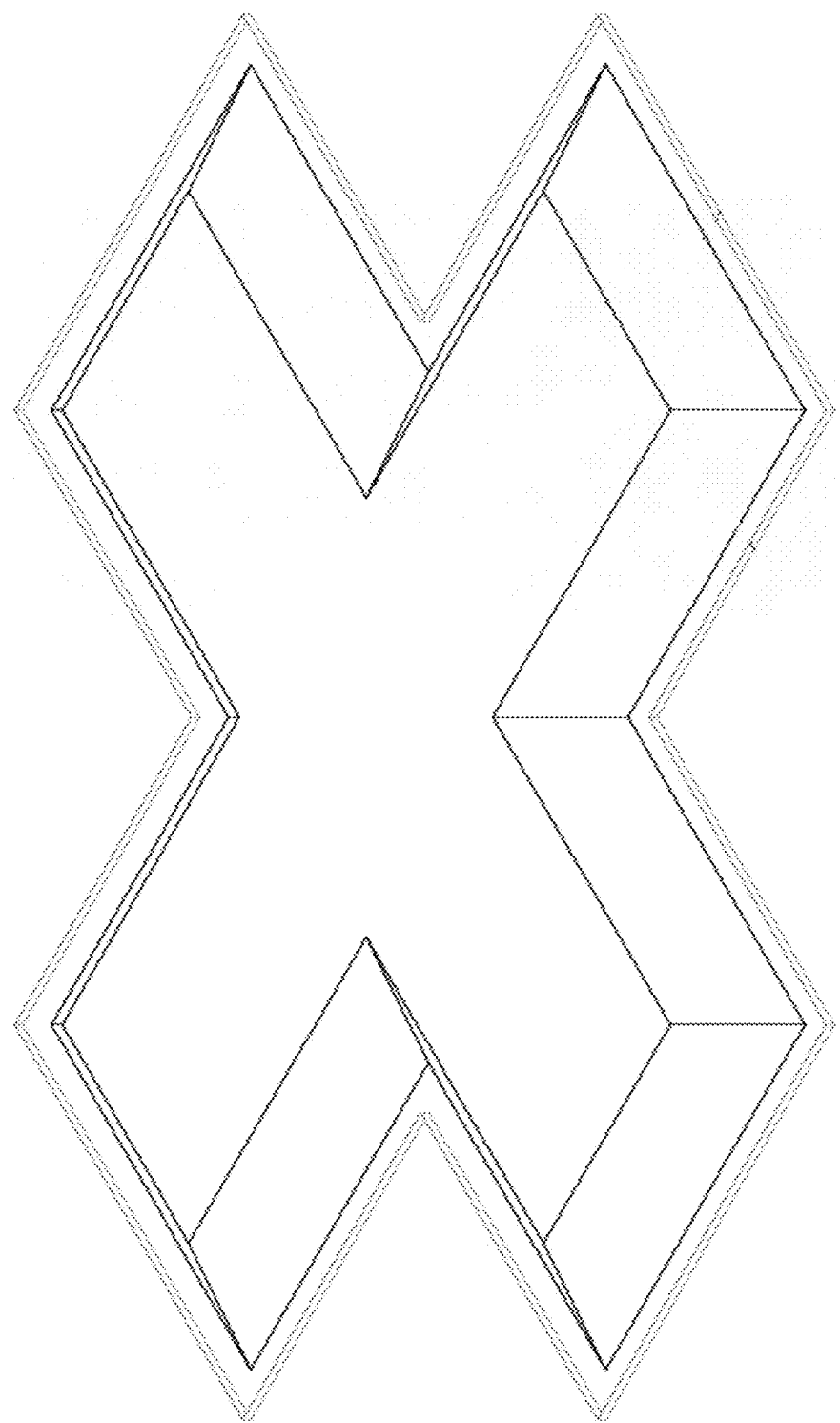
FIGS. 9A to 9E show hull designs according to some embodiments of the invention.
Figure 9B:
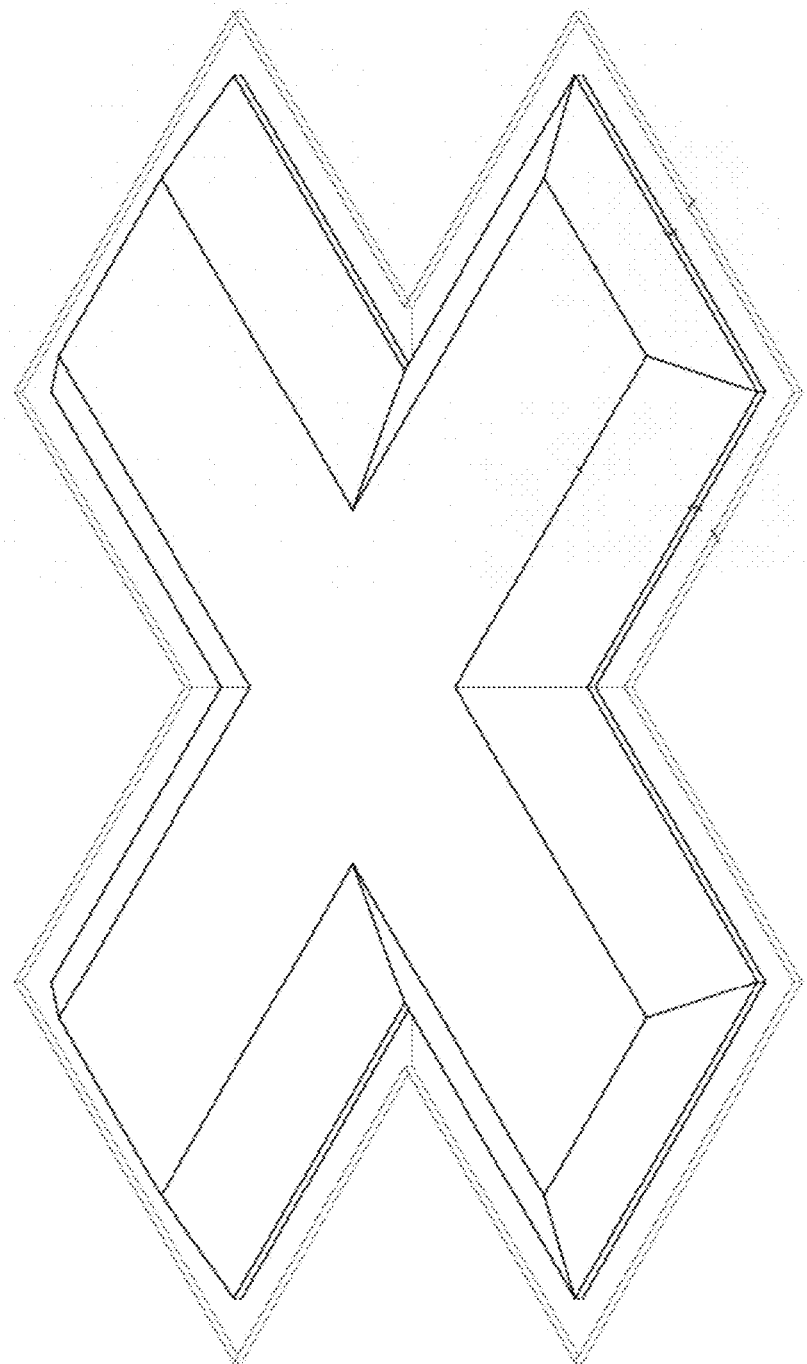
Figure 9C:
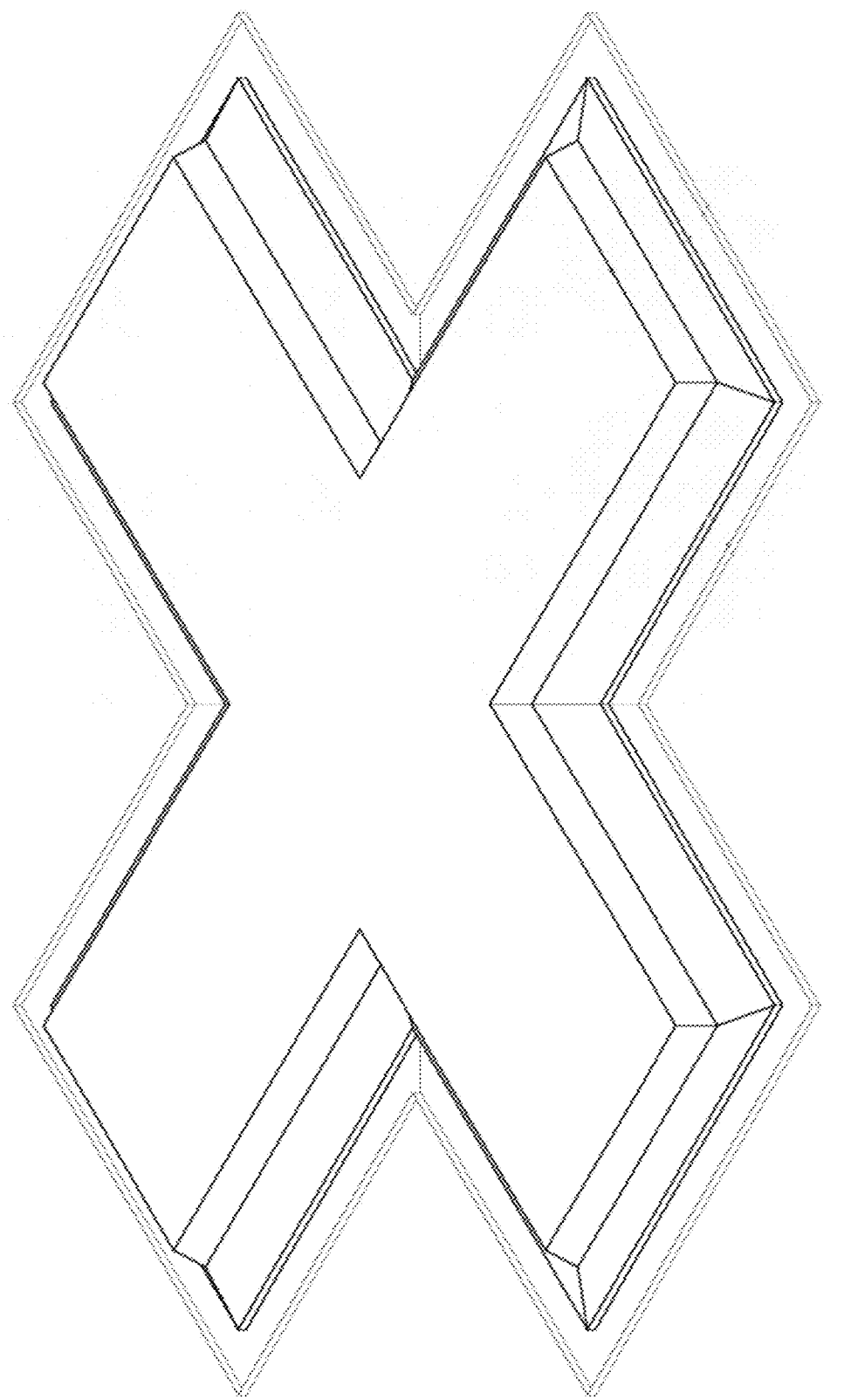
Figure 9D:
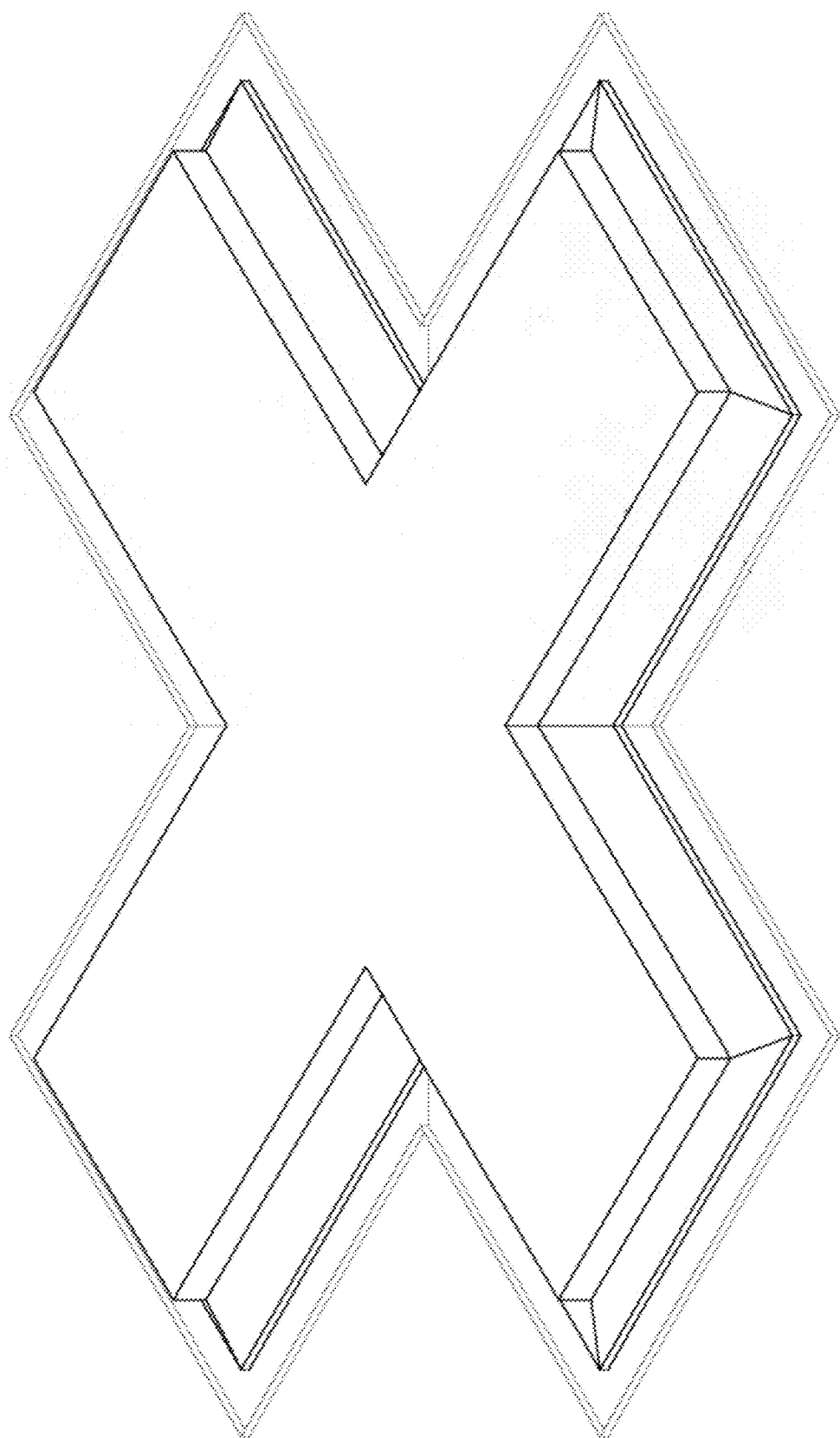
Figure 9E:
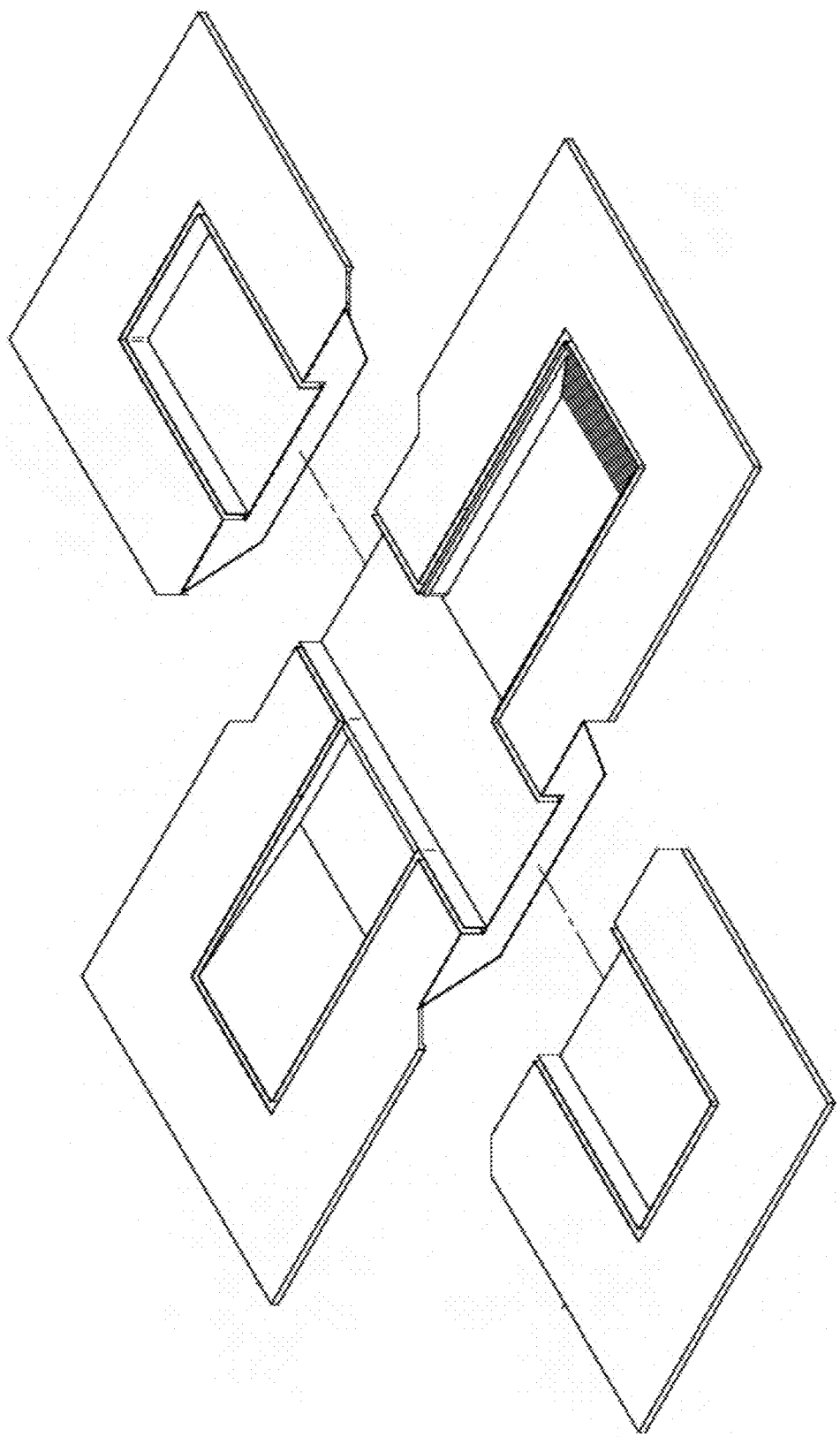
Figure 10A:
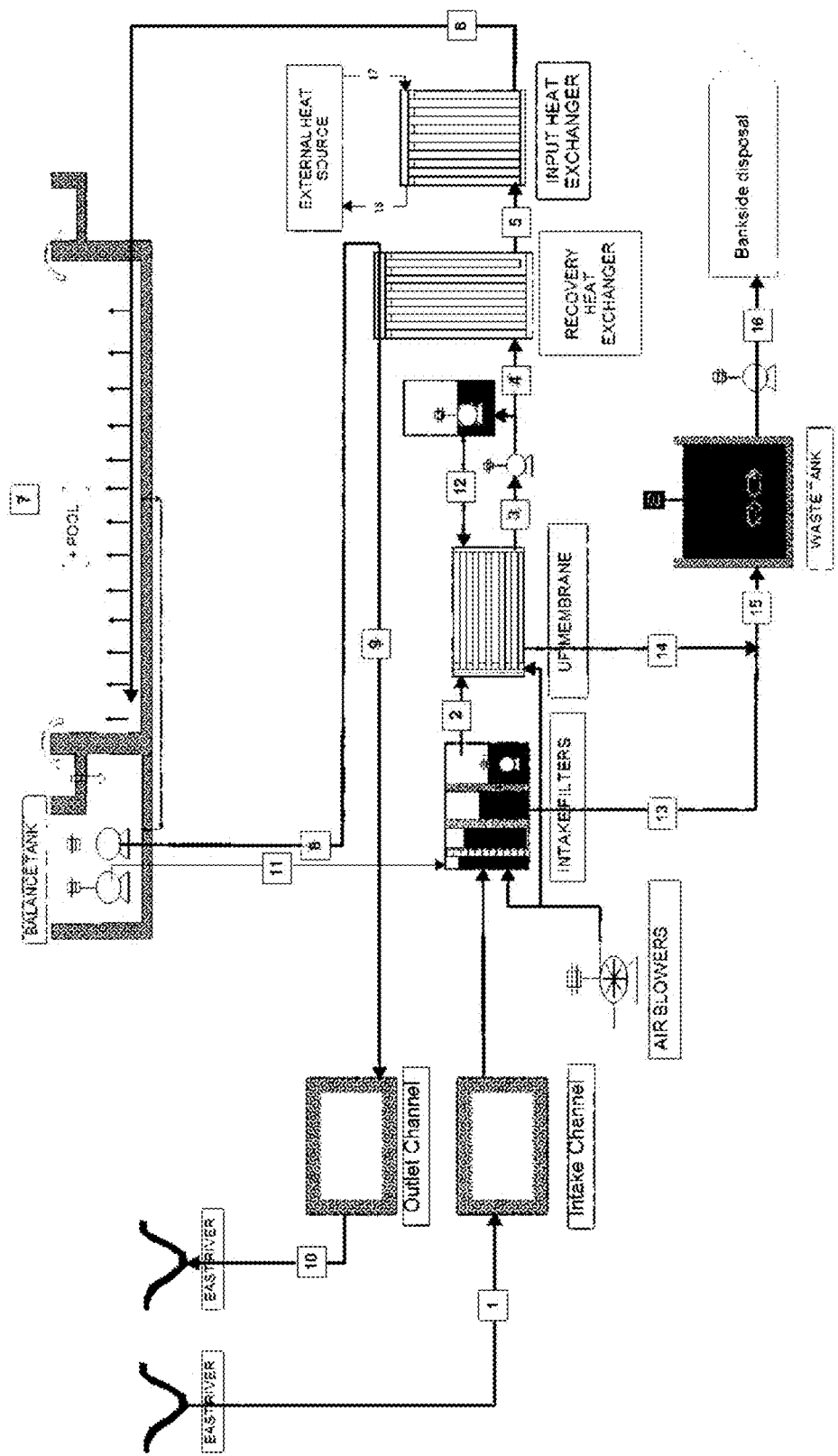
FIG. 10A shows a flow diagram of an ultrafiltration treatment method according to some embodiments of the invention.
Figure 10B:
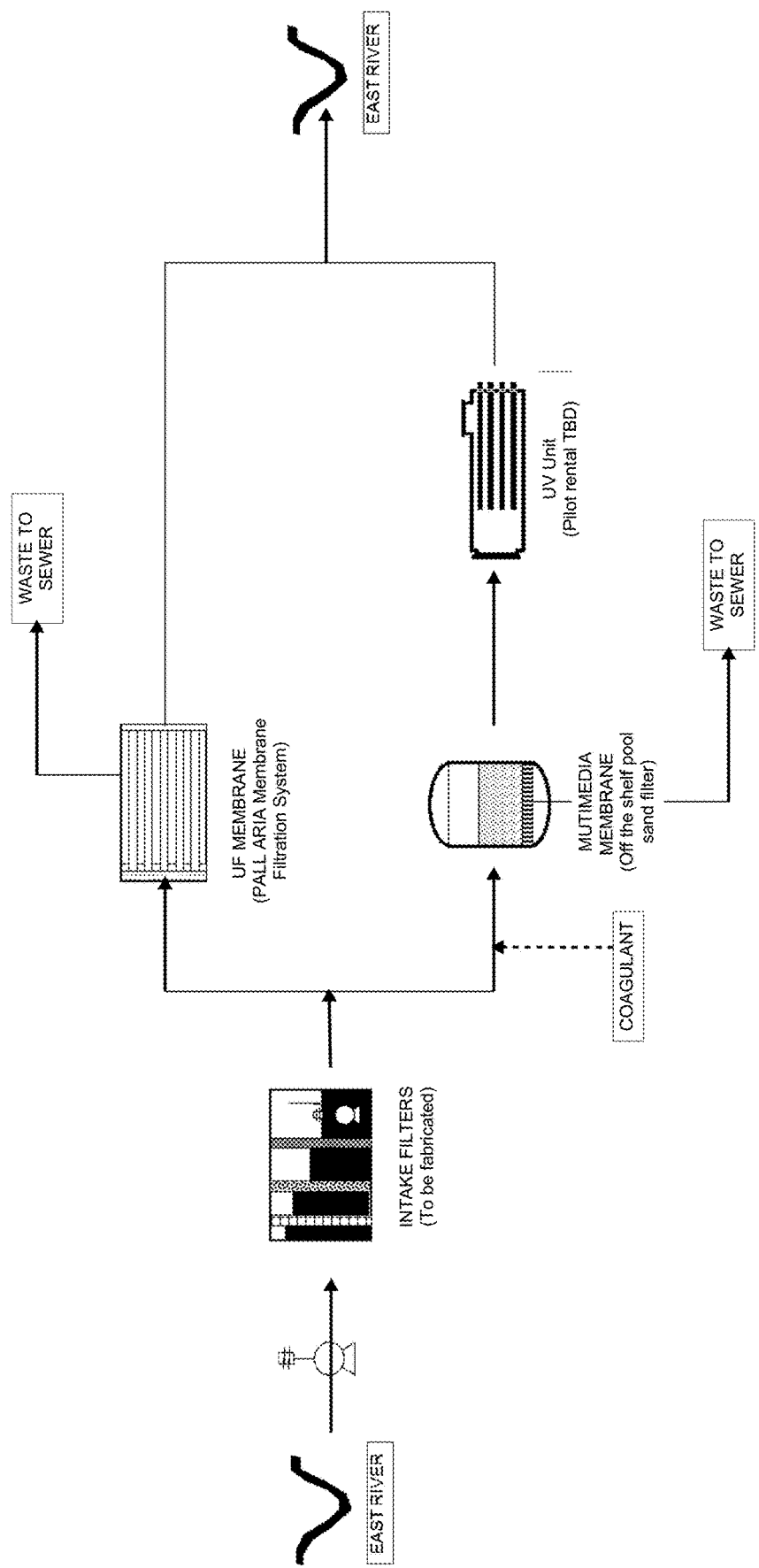
FIG. 10B shows a flow diagram comprising a multimedia filter and UV disinfection treatment method according to some embodiments of the invention.
Figure 11:
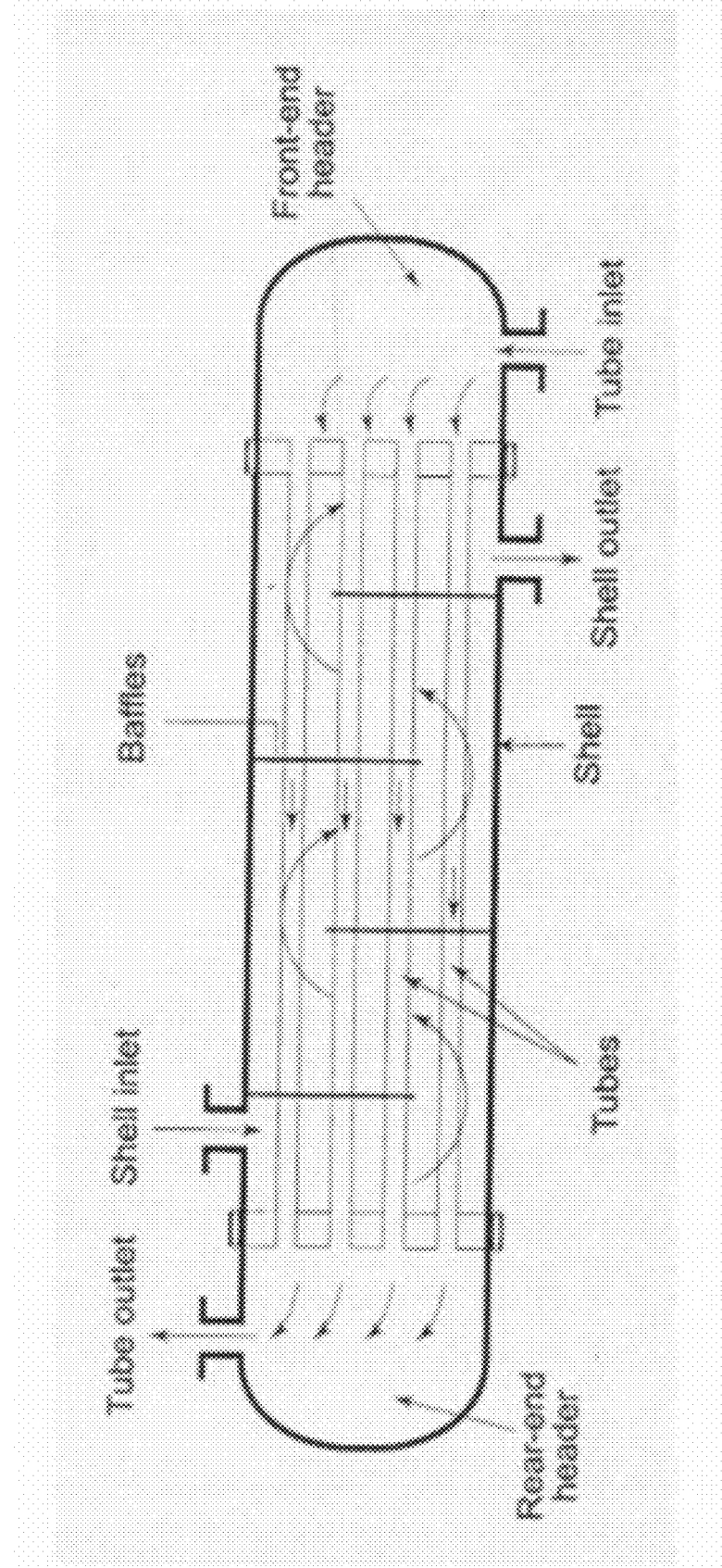
FIG. 11 shows a heat exchanger according to some embodiments of the invention.

According to some embodiments, a modular filtration unit (e.g. 800) is arranged around a hull holding water, wherein the hull floats, such as on a lake or river. In some embodiments, water from the river is drawn through the intake 810, prefiltration 820, ultrafiltration 830, and heat exchange 840 and then into the water held by the hull. In some embodiments, the water held by the hull is then returned to its original source, such as the lake or river. In some embodiments, the water held by the hull is not returned to its original source, but instead is reintroduced to one or more units comprising the modular filtration unit 800. According to some embodiments, some of the water held by the hull is reintroduced into one or more units comprising the modular filtration unit (e.g. 800) with the remainder being returned to its original source (e.g. a lake or river). According to some embodiments, water that is removed from the hull and returned to its original source is constantly being replaced by incoming water (i.e. a flow-through system) (FIG. 8B). In some embodiments, water held by the hull is recirculated into a modular filtration unit along with a small percentage of makeup water based on the loss of water and dilution needs (FIG. 8B). According to some embodiments, water entering the modular filtration unit and leaving the hull is at least 2 gallons per minute (GPM), 10 GPM, 50 GPM, 100 GPM, 500 GPM, 1100 GPM, 1,500 GPM, 2,000 GPM, 5,000 GPM, 10,000 GPM, or more. According to some embodiments, the water entering the hull from a modular filtration unit (e.g. 800) and the water being returned to the modular filtration unit (e.g. 800) from the hull is at least 2 gallons per minute (GPM), 10 GPM, 50 GPM, 100 GPM, 500 GPM, 1100 GPM, 1,500 GPM, 2,000 GPM, 5,000 GPM, 10,000 GPM, or more.

According to some embodiments, the flow of water through the modular filtration unit (e.g. 800) occurs via pipe layout.

Heat Exchange

According to some embodiments a heat exchanger is employed to recover heat from the water leaving the hull and using it to pre heat incoming water. According to some embodiments, a heat exchanger is effective to recapture the heat of outgoing water with an efficiency of at least 40%, at least 50%, at least 60%, at least 70%, at least 80%, or at least 90%, or more. According to some embodiments the heat exchanger is made from a corrosion resistant and foul resistant material, such as titanium. According to some embodiments, duplicate run and standby heat exchangers are provided so that one unit can be removed (for cleaning etc.) without affecting the operation of the heat exchange unit. According to some embodiments, a plate heat exchanger may be 3.9 ft length×1.6 ft width×6.6 ft height. According to some embodiments, the hull is insulated to avoid heat loss of water in the hull through the sides and base of the hull. According to some embodiments, the heat exchange comprises an element as shown and described in FIG. 11.

According to some embodiments, the heat exchange unit comprises a heating element driven by a power supply to raise the temperature of water. According to some embodiments, a heat exchange unit comprises a heat exchange pump. According to some embodiments, a heat exchange unit comprises at least a 100 W, at least 200 W, at least 300 W, at least 400 W, at least 600 W, at least 1,000 W heat pump. According to some embodiments, the heat exchange is effective to maintain water temperature at least 78 degrees F.

According to some embodiments, the combination of heat exchange unit and heating element are effective to maintain water temperature inside the hull at certain threshold levels. In some embodiments, the heat exchange unit and or heating element are effective to maintain the water temperature inside the hull at greater than or equal to 70 degrees, 75 degrees, 78 degrees, 80 degrees, 82 degrees, or more.

Filters

According to some embodiments, filters are used to remove impurities from water. For example, three or more intake (810) screen modules may be used. Each screen module may hold 16 plate filters. Each plate filter may be 5.9 ft high by 3.3 ft wide. Water (e.g. from a river) may be be distributed in between 4 sets of plates and the filtered water may be drawn out by a pump for an inside-out filtration flow. The plates may be be spaced apart so they can be washed from the top without removing them as well as having air sparges in between the plates for cleaning.

In some embodiments, a multimedia filter and UV treatment system using intake screens may be used to remove coarse particles, multimedia filters may be used to remove finer particles, and UV light may be used to disinfect river water for recreational use. In some embodiments, a coagulant may be added to entrap particles to be removed from the pool water supply, and directed to a waste stream. In some embodiments, sand filters may be backwashed with pool exit water, through an automated approach, and the waste solids and backwash stream may be collected in a waste storage tank for off-site disposal. (See FIG. 10A & 10B).

According to some embodiments, ultrafiltration (UF) intake screens may be used to remove coarse particles and ultrafiltration membranes may be used to remove particles and pathogens. In some embodiments, some or all waste goes to a waste tank for off-site disposal, including UF backwashing. In some embodiments, UF filters are backwashed with UF permeate, not pool water. According to some embodiments, blending waste back to the pool discharge may be used, but not for any waste flow that has addition of chemical during periodic daily chemical washes. (See FIG. 10A)

In some embodiments, ultrafiltration membranes may be used to provide a simple and effective barrier for high quality of particle and pathogen removal. According to some embodiments, the treatment method is a chemical free process and does not create any disinfection bi-products. In some embodiments, ultrafiltration membranes are chemically cleaned daily to increase their life. In some embodiments, a lower loading rate is used to operate without chemical cleaning.

According to some embodiments, the ultrafiltration 830 unit is a is a self-contained, complete system, which requires a process inlet at pressure and delivers filtered product to either a holding tank or directly forward to a discharge header. In some embodiments, included in the system is a PLC/PC based control, data logging and remote monitoring system, which may be programmed to automatically control all aspects of the process. In some embodiments, the ultrafiltration unit is designed to handle flows up to 25 GPM, depending on feed water quality. In some embodiments, the ultrafiltration unit comprises remote-monitoring feature, providing access to multiple operating parameters via modem connection to the unit's computer. In some embodiments, the ultrafiltration unit's computer will monitor and record trans-membrane pressure, flow rate and turbidity for performance assessments, as well as operating temperature, pressure and other parameters useful for optimizing operation. According to some embodiments, components (e.g. filters) of the ultrafiltration unit have a maximum flow rate of 15-40 GPM, a maximum feed connection pressure of about 40 psi, and a maximum filtrate delivery pressure (at connection) of about 5 psi. According to some embodiments, the ultrafiltration unit comprises an ARIA Membrane Filtration System by Pall Water.

According to some embodiments, one or more filters are effective to maintaining water quality to recreational bathing standards. In some embodiments, the pre-filtration unit and ultrafiltration unit are effective to maintain sample enterococci concentrations at or below certain threshold values. For example, the pre-filtration unit and ultrafiltration units may be effective to maintain single sample enterococci concentrations at 104 Colony Forming Units (CFU's) per 100 mL (61 Colony Forming Units (CFU's) per 100 mL for fresh water) or less for water deposited into the hull, measured by EPA method 1600. As another example, the pre-filtration unit and ultrafiltration units may be effective to maintain enterococci geometric mean of at least 5 samples at concentrations of 35 Colony Forming Units (CFU's) per 100 mL (33 Colony Forming Units (CFU's) per 100 mL for fresh water) or less for water deposited into the hull, measured by EPA method 1600.

Figure 12:
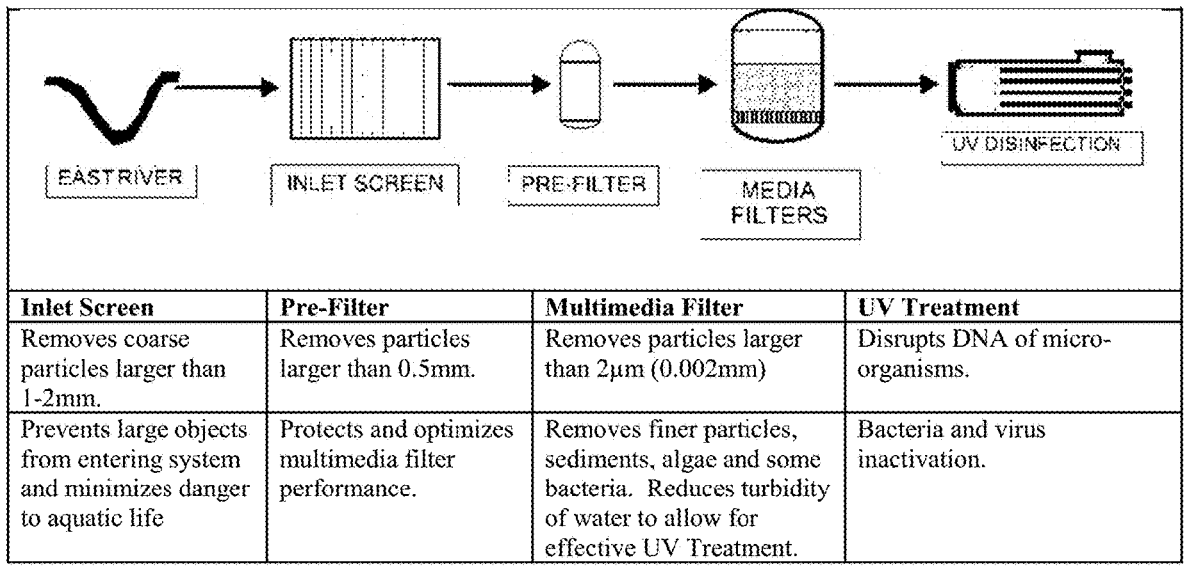
FIG. 12 shows filtration comprising multimedia filtration with ultraviolet treatment according to some embodiments of the invention.
Figure 13:
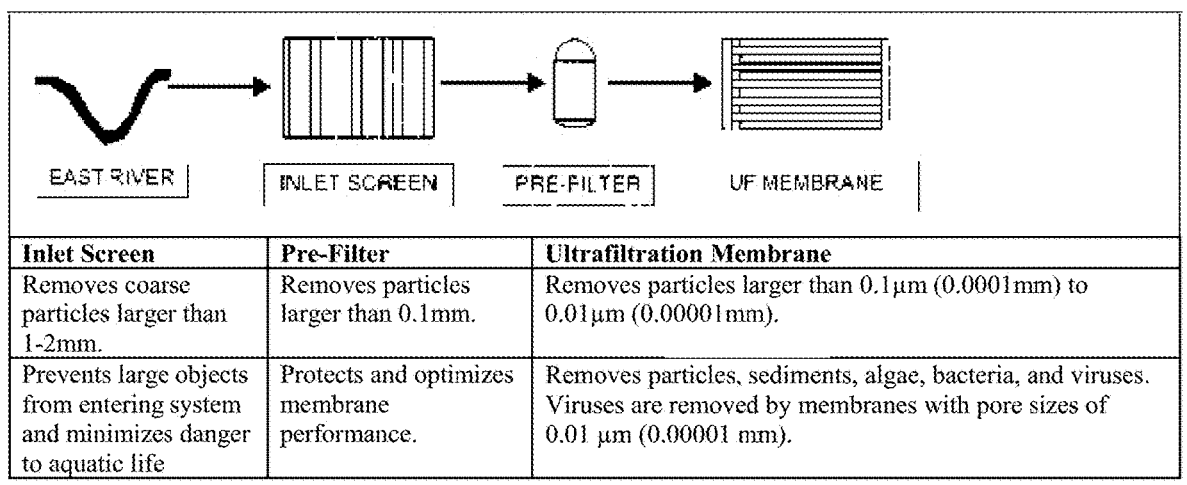
FIG. 13 shows a filtration comprising ultrafiltration according to some embodiments of the invention.

According to some embodiments, the modular filtration unit comprises one or more components depicted in FIGS. 12-13. According to some embodiments, the modular filtration unit comprises an inlet screen. In some embodiments, impure water (e.g. river water) will be drawn through inlet screens which remove coarse particles and minimizes danger to aquatic life. In some embodiments, the inlet screen will be a wedge wire screen with openings between 1-2 mm, externally mounted and cleaned occasionally with compressed air. In some embodiments, the intake screen is a flat fish diversion screen (Hendrick Corp). In some embodiments, the intake screen is a T-intake screen (Hendrick Corp.)

According to some embodiments, the modular filtration unit comprises a pre-filter. In some embodiments water pumped through an inlet screen is then passed through a pre-filter to optimize the performance of the downstream filtration options and protect those filters from potential damage. In some embodiments, the pre-filter for the multimedia filter comprises an opening no larger than 0.5 mm and the pre-filter for the ultrafiltration/microfiltration membrane comprises an opening no larger than 0.1 mm. In some embodiments, pre-filters may be backwashed to maintain performance. In some embodiments, the pre-filter comprises a fine screen cylinder (Amiad USA). In some embodiments, the pre-filter comprises a disc filter (Amiad USA).

In some embodiments, the modular filtration unit comprises a multimedia filter and/or a UV filter. In some embodiments, the multimedia filter comprises sand used in pressurized media filters to provide the physical removal of finer particles. In some embodiments, the media filter is effective to removes particles down to ~2 microns (e.g. using Pep Active). In some embodiments, the media filter comprises media that is negatively charged to adsorb organics and small particles. In some embodiments. The media filter comprises media that is NSF-61 and NSF-50 certified. In some embodiments, the UV filter comprises emits UV light of a particular wavelength to disrupt the DNA of microorganisms. In some embodiments, UV disinfection is approved by the USEPA and is a chemical-free process commonly used to disinfect drinking water. In some embodiments, the UV filter is NSF-50 certified and meets USEPA Drinking Water Standards. In some embodiments, the UV filter comprises an internal UV lamp arrangement with horizontal flow (Aquinoics).

In some embodiments, the modular filtration unit comprises an ultrafiltration unit. In some embodiments, the ultrafiltration unit comprises ultrafiltration membranes that are semipermeable membrane that remove solids that are too large to fit through the membrane's pore size. In some embodiments, the ultrafiltration unit comprises ultrafiltration membranes that range from 0.1 to 0.01 microns. In some embodiments, the pore sizes of membranes are no larger than 0.1 microns. In some embodiments, the ultrafiltration unit comprises systems that are designed to produce drinking water and remove turbidity and microbial pathogens. Some non-limiting examples of microbial and particulate removal is shown below:

| Contaminants | Typical Removal | |
| --- | --- | --- |
| | Microfiltration (MF) | Ultrafiltration (UF) |
| Giardia | >6 (log) | >6 (log) |
| Cryptosporidium | >6 (log) | >6 (log) |
| MS2 Coliphage or Bacteriophage | 0.5-2.5 log | 4.5-6 log |
| Turbiditiy | <0.1 ntu | <0.1 ntu |

Variations, modifications, and other implementations of what is described herein may occur to those of ordinary skill in the art without departing from the spirit and scope of the present invention and its claims.

Additional Embodiments

Embodiment 1. A modular filtration unit for filtering unpurified water, the unit comprising:
at least one modular removable filtration cartridge comprising a plurality of pressed non-woven geotextile fabrics, and a frame assembly for holding the plurality of pressed non-woven geotextile fabrics; and
a filtration container for holding the at least one modular removable filtration cartridge, the filtration container comprising two transverse walls and two longitudinal walls forming a basin,
the two transverse walls comprising a first transverse wall and a second transverse wall, the first transverse wall having an inlet for receiving water into the filtration container, the inlet disposed proximate to a top of the filtration container, the second transverse wall comprising an outlet for draining water out of the filtration container, the outlet disposed proximate to the top of the filtration container, and wherein the water in the filtration container flows substantially longitudinally from the inlet to the outlet, allowing sediment to collect in a bottom area of the basin, and the at least one modular removable filtration cartridge filters the water as it passes through the filtration container.

Embodiment 2. The modular filtration unit of any preceding embodiment, wherein each of the two longitudinal walls of the filtration container include a rail for inserting and removing the at least one modular removable filtration cartridge transversely to the longitudinal flow of water passing in the basin, and wherein the at least one modular removable filtration cartridge filters the water by blocking sediment flowing longitudinally from the first transverse wall to the second transverse wall.

Embodiment 3. The modular filtration unit of any preceding embodiment, wherein the plurality of pressed non-woven geotextile fabrics have a pore size of 150 microns.

Embodiment 4. The modular filtration unit of any preceding embodiment, wherein each of the plurality of pressed non-woven geotextile fabrics have pore sizes that vary based on the position of the filtration cartridge within the basin.

Embodiment 5. The modular filtration unit of any preceding embodiment, wherein the plurality of pressed non-woven geotextile fabrics have a weight of 10 oz. or 16 oz.

Embodiment 6. The modular filtration unit of any preceding embodiment, wherein the plurality of pressed non-woven geotextile fabrics is corrugated.

Embodiment 7. The modular filtration unit of any preceding embodiment, wherein the first and second transverse walls of the filtration container include a rail for inserting and removing the at least one modular removable filtration cartridge in parallel with the longitudinal flow of water passing in the basin, and wherein the at least one modular removable filtration cartridge filters the water by blocking sediment flowing transversely across the basin from a first longitudinal wall to a second longitudinal wall.

Embodiment 8. The modular filtration unit of any preceding embodiment, wherein the plurality of pressed non-woven geotextile fabrics comprise a blend of nylon and have a pore size less than 1 micron.

Embodiment 9. The modular filtration unit of any of any preceding embodiment, wherein the plurality of pressed non-woven geotextile fabrics is corrugated.

Embodiment 10. The modular filtration unit of any of any preceding embodiment, wherein the bottom surface of the filtration container includes a receptacle for inserting and removing the at least one modular removable filtration cartridge, the at least one modular removable filtration cartridge is tubular, and the at least one modular removable filtration cartridge filters the water by radially absorbing the water through the center of the tubular filtration cartridge.

Embodiment 11. A zoned filtration assembly for filtering water comprising three modular filtration units, a first modular filtration unit according to any preceding embodiment, a second modular filtration according to any preceding embodiment, and a third modular filtration unit according to any preceding embodiment, wherein water enters the zoned filtration assembly through the inlet of the first modular filtration unit, flows through the outlet of the first modular filtration unit to the inlet of the second modular filtration unit, and flows through the outlet of the second modular filtration unit to the third modular filtration unit.

Embodiment 12. A swimming pool comprising at least one hull for receiving a zoned filtration assembly according to any preceding embodiment, wherein the outlet of the third modular filtration unit outputs filtered water into the swimming pool.

Embodiment 13. The swimming pool of any preceding embodiment, further comprising a hatch for concealing the zoned filtration assembly.

Embodiment 14. The swimming pool of any preceding embodiment, wherein the water entering the inlet of the first modular filtration unit is untreated water from a natural source, and the water output by the third modular filtration unit has less than 4 cfu/100 ml.

Embodiment 15. The modular filtration unit of any preceding embodiment, wherein the frame assembly comprises a first frame, a second frame, and a fastener for joining the first and second frames, the plurality of pressed non-woven geotextile fabrics secured between the first and second frames by the fastener.

Embodiment 16. The modular filtration unit of any preceding embodiment, wherein the frame assembly is made of aluminum.

Embodiment 17. The modular filtration unit of any preceding embodiment, wherein the frame assembly further comprises an inflatable gasket, the inflatable gasket wraps around the outer perimeter of the first and second frames, and upon inflation inflatable gasket provides a water-tight barrier between the frame, the rail, and the bottom of the basin.

Embodiment 18. A method for filtering water through a modular filtration unit, the method comprising:

forming at least one modular removable filtration cartridge, the at least one modular removable filtration cartridge comprising a plurality of pressed non-woven geotextile fabrics, and a frame assembly for holding the plurality of pressed non-woven geotextile fabrics;

forming a filtration container for holding the at least one filtration cartridges, the filtration container comprising two transverse walls and two longitudinal walls forming a basin, the first wall comprising an inlet for receiving water into the container, the inlet disposed proximate to the top of the container, the second wall comprising an outlet for passing water out of the container, the outlet disposed proximate to the top of the container;

installing the at least one modular removable filtration cartridge into the filtration container; and filtering water that enters the inlet of the filtration container, wherein the at least one modular removable filtration cartridge filters the water as it passes through the basin.

Embodiment 19. A method for filtering water through cascaded modular filtration units, the method comprising:

forming a first filtration zone according to the steps of any preceding embodiment, forming a second filtration zone according to the steps of any preceding embodiment, and forming a third filtration zone according to the steps of any preceding embodiment, wherein water is filtered by flowing from the first filtration zone to the second filtration zone, and from the second filtration zone to the third filtration zone.

Embodiment 20. The method of any preceding embodiment, further comprising directing the filtered water from the third filtration zone to a swimming pool.

Embodiment 21. A filtration apparatus for filtering water, the filtration apparatus comprising:
  a hull effective to hold filtered water and float on a body of impure water; and
  a modular filtration unit effective to filter impure water from the body of impure water and deposit the filtered water into the hull, wherein the modular filtration unit comprises:
    at least one intake unit that is effective to create a reservoir of impure water, the intake unit comprising perforations in one or more walls that are effective to allow passive water flow;
    at least one pre-filtration unit operably connected to the intake unit, the pre-filtration unit comprising one or more filters effective to remove impurities from water;
    at least one ultrafiltration unit operably connected to the pre-filtration unit, the ultrafiltration unit comprising one or more filters effective to remove impurities from water than are not removed by the pre-filtration unit; and
    at least one heat exchange unit operably connected to the ultrafiltration unit, the heat exchange unit effective to transfer heat from water held by the hull to water that is being transferred into the hull.

Embodiment 22. The filtration apparatus of any preceding embodiment, wherein the impure water from the intake is transmitted to the pre-filtration unit, the ultrafiltration unit, and heat exchange unit before being deposited in the hull.

Embodiment 23. The filtration apparatus of any preceding embodiment, wherein the filtered water from the hull is returned to the body of impure water.

Embodiment 24. The filtration apparatus of any preceding embodiment, wherein the filtered water in the hull is recirculated through one or more of the pre-filtration and ultrafiltration units and deposited back in the hull.

Embodiment 25. The filtration apparatus of any preceding embodiment, the amount of water entering the hull and the amount of water leaving the hull is between 2 gallons per minutes (GPM) and 10,000 GPM.

Embodiment 26. The filtration apparatus of any preceding embodiment, wherein the heat exchange unit has an efficiency of at least 80%.

Embodiment 27. The filtration apparatus of any preceding embodiment, further comprising a heating element driven by a power supply.

Embodiment 28. The filtration apparatus of any preceding embodiment, wherein the heating element and heat exchange unit are effective to maintain water temperature in the hull to at least 78 degrees F.

Embodiment 29. The filtration apparatus of any preceding embodiment, wherein the filters comprise ultrafiltration intake screens effective to remove coarse particles and ultrafiltration membranes effective to remove fine particles and pathogens.

Embodiment 30. The filtration apparatus of any preceding embodiment, wherein the hull is formed in the shape of a plus (+) sign and two or more modular filtration units are connected to the hull in a manner effective to stabilize or balance the hull as the hull floats on a body of impure water.

Embodiment 31. The filtration apparatus of any preceding embodiment, wherein the filters comprise pressed non-woven geotextile fabrics having a pore size of 150 microns.

Embodiment 32. The filtration apparatus of any preceding embodiment, wherein the filters comprise pressed non-woven geotextile fabrics comprise a blend of nylon and have a pore size less than 1 micron.

Embodiment 33. The filtration apparatus of any preceding embodiment, wherein the impure water passes through the filters of the pre-filtration unit and ultrafiltration unit.

Embodiment 34. The filtration apparatus of any preceding embodiment, wherein the pre-filtration unit and ultrafiltration unit are effective to maintain single sample enterococci concentrations at 104 Colony Forming Units (CFU's) per 100 mL or less for water deposited into the hull, measured by EPA method 1600.

Embodiment 35. The filtration apparatus of any preceding embodiment, wherein the pre-filtration unit and ultrafiltration unit are effective to maintain single sample enterococci concentrations at 61 Colony Forming Units (CFU's) per 100 mL or less for water deposited into the hull, measured by EPA method 1600.

Embodiment 36. The filtration apparatus of any preceding embodiment, wherein the pre-filtration unit and ultrafiltration unit are effective to maintain enterococci geometric mean of at least 5 samples at concentrations of 35 Colony Forming Units (CFU's) per 100 mL or less for water deposited into the hull, measured by EPA method 1600.

Embodiment 37. The filtration apparatus of any preceding embodiment, wherein the pre-filtration unit and ultrafiltration unit are effective to maintain enterococci geometric mean of at least 5 samples at concentrations of 33 Colony Forming Units (CFU's) per 100 mL or less for water deposited into the hull, measured by EPA method 1600.

What is claimed is:

1. A modular filtration unit for filtering unpurified water, the unit comprising:
  at least one modular removable filtration cartridge comprising a plurality of pressed non-woven geotextile fabrics, and a frame assembly for holding the plurality of pressed non-woven geotextile fabrics; and
  a filtration container for holding the at least one modular removable filtration cartridge, the filtration container comprising two transverse walls and two longitudinal walls forming a basin,
    the two transverse walls comprising a first transverse wall and a second transverse wall, the first transverse wall having an inlet for receiving water into the filtration container, the inlet disposed proximate to a top of the filtration container, the second transverse wall comprising an outlet for draining water out of the filtration container, the outlet disposed proximate to the top of the filtration container, and
    wherein the water in the filtration container flows substantially longitudinally from the inlet to the outlet, allowing sediment to collect in a bottom area of the basin, and the at least one modular removable filtration cartridge filters the water as it passes through the filtration container,
    wherein the first and second transverse walls of the filtration container include a rail for inserting and removing the at least one modular removable filtration cartridge in parallel with the longitudinal flow of water passing in the basin, and wherein the at least one modular removable filtration cartridge filters the water by blocking sediment flowing transversely across the basin from a first longitudinal wall to a second longitudinal wall.

2. The modular filtration unit of claim 1, wherein each of the two longitudinal walls of the filtration container include a rail for inserting and removing the at least one modular removable filtration cartridge transversely to the longitudinal flow of water passing in the basin, and wherein the at least one modular removable filtration cartridge filters the water by blocking sediment flowing longitudinally from the first transverse wall to the second transverse wall.

3. The modular filtration unit of claim 1, wherein each of the plurality of pressed non-woven geotextile fabrics have pore sizes that vary based on the position of the filtration cartridge within the basin.

4. The modular filtration unit of claim 1, wherein the plurality of pressed non-woven geotextile fabrics is corrugated.

5. The modular filtration unit of claim 1, wherein the plurality of pressed non-woven geotextile fabrics have a pore size less than 1 micron.

6. A swimming pool comprising at least one hull for receiving a zoned filtration assembly for filtering water comprising a first modular filtration unit, a second modular filtration unit, and a third modular filtration unit,
wherein each of the first modular filtration unit, second modular filtration unit, and third modular filtration unit comprise:
at least one modular removable filtration cartridge comprising a plurality of pressed non-woven geotextile fabrics, and a frame assembly for holding the plurality of pressed non-woven geotextile fabrics; and
a filtration container for holding the at least one modular removable filtration cartridge, the filtration container comprising two transverse walls and two longitudinal walls forming a basin,
the two transverse walls comprising a first transverse wall and a second transverse wall, the first transverse wall having an inlet for receiving water into the filtration container, the inlet disposed proximate to a top of the filtration container, the second transverse wall comprising an outlet for draining water out of the filtration container, the outlet disposed proximate to the top of the filtration container, and
wherein the water in the filtration container flows substantially longitudinally from the inlet to the outlet, allowing sediment to collect in a bottom area of the basin, and the at least one modular removable filtration cartridge filters the water as it passes through the filtration container,
wherein water enters the zoned filtration assembly through the inlet of the first modular filtration unit, flows through the outlet of the first modular filtration unit to the inlet of the second modular filtration unit, and flows through the outlet of the second modular filtration unit to the third modular filtration unit, wherein the outlet of the third modular filtration unit outputs filtered water into the swimming pool.

7. The modular filtration unit of claim 6, wherein the plurality of pressed non-woven geotextile fabrics is corrugated.

8. The swimming pool of claim 6, further comprising a hatch for concealing the zoned filtration assembly.

9. The modular filtration unit of claim 1, wherein the frame assembly comprises a first frame, a second frame, and a fastener for joining the first and second frames, the plurality of pressed non-woven geotextile fabrics secured between the first and second frames by the fastener.

10. A method for filtering water through a modular filtration unit, the method comprising:
forming at least one modular removable filtration cartridge, the at least one modular removable filtration cartridge comprising a plurality of pressed non-woven geotextile fabrics, and a frame assembly for holding the plurality of pressed non-woven geotextile fabrics;
forming a filtration container for holding the at least one filtration cartridges, the filtration container comprising two transverse walls and two longitudinal walls forming a basin, the first wall comprising an inlet for receiving water into the container, the inlet disposed proximate to the top of the container, the second wall comprising an outlet for passing water out of the container, the outlet disposed proximate to the top of the container;
installing the at least one modular removable filtration cartridge into the filtration container;
filtering water that enters the inlet of the filtration container, wherein the at least one modular removable filtration cartridge filters the water as it passes through the basin; and
directing the filtered water to a swimming pool.

11. The method for filtering water according to claim 10, the method further comprising:
forming a first filtration zone,
forming a second filtration zone, and
forming a third filtration zone,
wherein water is filtered by flowing from the first filtration zone to the second filtration zone, and from the second filtration zone to the third filtration zone.

* * * * *